(12) United States Patent
Kang et al.

(10) Patent No.: US 9,898,231 B2
(45) Date of Patent: Feb. 20, 2018

(54) SYSTEM AND METHOD OF MOBILE PRINTING USING NEAR FIELD COMMUNICATION

(71) Applicant: S-PRINTING SOLUTION CO., LTD., Suwon-si, Gyeonggi-do (KR)

(72) Inventors: Kyung-hoon Kang, Suwon-si (KR); Hak-ju Lee, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/281,979

(22) Filed: Sep. 30, 2016

(65) Prior Publication Data

US 2017/0017439 A1    Jan. 19, 2017

Related U.S. Application Data

(63) Continuation of application No. 14/265,639, filed on Apr. 30, 2014, now Pat. No. 9,459,822.

(30) Foreign Application Priority Data

Jun. 3, 2013 (KR) .................. 10-2013-0063700

(51) Int. Cl.
*G06F 3/12* (2006.01)
*H04N 1/00* (2006.01)
(Continued)

(52) U.S. Cl.
CPC .......... *G06F 3/1204* (2013.01); *G06F 3/1211* (2013.01); *G06F 3/1229* (2013.01);
(Continued)

(58) Field of Classification Search
CPC .... G06F 3/1204; G06F 3/1292; G06F 3/1236; G06F 3/1229; G06F 3/1284; G06F 3/1211; H04B 5/0031; H04B 5/0025; H04N 1/00395; H04N 2201/006; H04N 2201/0055; H04N 2201/0094; H04N 2201/3205; H04W 4/008; H04W 76/023; H04W 12/00; H04W 84/12
(Continued)

(56) References Cited

U.S. PATENT DOCUMENTS 6,987,580 B2 * 1/2006 Watanabe ........... H04M 3/5322
358/1.15
8,406,253 B2 3/2013 Kato et al.
(Continued)

FOREIGN PATENT DOCUMENTS

CN    102356627 A    2/2012
CN    102929567 A    2/2013
(Continued)

*Primary Examiner* — Allen H Nguyen
(74) *Attorney, Agent, or Firm* — Jefferson IP Law, LLP

(57) ABSTRACT

A method of mobile printing using near field communication (NFC) includes executing a mobile printing application installed in a mobile device; setting a wireless connection for data transmission between the mobile device and an image forming apparatus by performing NFC tagging on the image forming apparatus with the mobile device; and automatically performing a function corresponding to a status of the mobile printing application when NFC tagging is performed.

18 Claims, 27 Drawing Sheets

(51) Int. Cl.
*H04W 76/02* (2009.01)
*H04W 4/00* (2009.01)
*H04B 5/00* (2006.01)
*H04W 12/00* (2009.01)
*H04W 12/04* (2009.01)
*H04W 84/12* (2009.01)

(52) U.S. Cl.
CPC .......... *G06F 3/1236* (2013.01); *G06F 3/1292* (2013.01); *H04B 5/0025* (2013.01); *H04B 5/0031* (2013.01); *H04N 1/00395* (2013.01); *H04W 4/008* (2013.01); *H04W 12/00* (2013.01); *H04W 12/04* (2013.01); *H04W 76/023* (2013.01); *G06F 3/1284* (2013.01); *H04N 2201/006* (2013.01); *H04N 2201/0055* (2013.01); *H04N 2201/0094* (2013.01); *H04N 2201/3205* (2013.01); *H04W 84/12* (2013.01)

(58) Field of Classification Search
USPC ........................................................ 358/1.15
See application file for complete search history.

(56) References Cited

U.S. PATENT DOCUMENTS

| | | | |
|---|---|---|---|
| 8,462,734 | B2 | 6/2013 | Laine et al. |
| 8,718,558 | B2 | 5/2014 | Montemurro |
| 8,739,263 | B2 | 5/2014 | Azuma |
| 8,749,823 | B2 | 6/2014 | Kato |
| 8,780,383 | B2* | 7/2014 | Vendrow ................ G06F 21/64 358/1.1 |
| 8,805,279 | B2 | 8/2014 | Choi et al. |
| 8,844,008 | B2 | 9/2014 | Hashimoto |
| 8,958,100 | B2 | 2/2015 | Nishikawa et al. |
| 2009/0033972 | A1 | 2/2009 | Kato |
| 2009/0033984 | A1* | 2/2009 | Sahashi ................ G06F 21/608 358/1.15 |
| 2009/0033985 | A1* | 2/2009 | Platov ................ H04N 1/00209 358/1.15 |
| 2009/0103124 | A1 | 4/2009 | Kimura et al. |
| 2011/0002005 | A1* | 1/2011 | Ashmore ........... H04N 1/00307 358/1.15 |
| 2011/0116125 | A1 | 5/2011 | Park |
| 2011/0194138 | A1 | 8/2011 | Seo et al. |
| 2011/0292445 | A1 | 12/2011 | Kato |
| 2011/0312380 | A1* | 12/2011 | Bard ................ H04N 1/00307 455/557 |
| 2012/0214414 | A1 | 8/2012 | Abel et al. |
| 2012/0262749 | A1 | 10/2012 | Yamamoto |
| 2012/0264372 | A1 | 10/2012 | Chen et al. |
| 2012/0315608 | A1 | 12/2012 | Miller-Kovach et al. |
| 2012/0322411 | A1 | 12/2012 | Lazarev et al. |
| 2013/0023258 | A1 | 1/2013 | Choi et al. |
| 2013/0038896 | A1 | 2/2013 | Nalewajek |
| 2013/0208310 | A1* | 8/2013 | Nakashima ........ H04N 1/00244 358/1.15 |
| 2013/0215467 | A1 | 8/2013 | Fein et al. |
| 2013/0260818 | A1* | 10/2013 | Suzuki ................ H04W 88/06 455/552.1 |
| 2014/0068719 | A1 | 3/2014 | Kiukkonen et al. |
| 2014/0279250 | A1 | 9/2014 | Williams |
| 2014/0368865 | A1* | 12/2014 | Gutnik ................ G06F 3/1222 358/1.15 |

FOREIGN PATENT DOCUMENTS

| | | |
|---|---|---|
| EP | 2 026 615 A3 | 2/2009 |
| KR | 10-2005-0037041 A | 4/2005 |
| WO | 2010/107125 A1 | 9/2010 |

* cited by examiner

SYSTEM AND METHOD OF MOBILE PRINTING USING NEAR FIELD COMMUNICATION

CROSS-REFERENCE TO RELATED APPLICATIONS

This application is a continuation application of a prior application Ser. No. 14/265,639, filed on Apr. 30, 2014, which has issued as U.S. Pat. No. 9,459,822 on Oct. 4, 2016 and claimed the benefit under 35 U.S.C. § 119(a) of a Korean patent application filed on Jun. 3, 2013 in the Korean Intellectual Property Office and assigned Serial number 10-2013-0063700, the entire disclosure of which is hereby incorporated by reference.

TECHNICAL FIELD

One or more exemplary embodiments of the present general inventive concept relate to a system and method of mobile printing using near field communication (NFC).

BACKGROUND

As mobile communication technologies are developed and mobile communication devices have become popularized, mobile devices such as smartphones, tablet personal computers (PCs), and personal digital assistances (PDAs) have begun to replace existing PCs. In the field of image forming apparatuses such as printers, scanners, faxes, copying machines, and multifunction printers (MFPs), research is currently being conducted into a technology to allow a mobile device to directly use an image forming apparatus without accessing a PC.

Specifically, in order to overcome interface restrictions of mobile devices and to ensure mobility, wireless communication is preferred between an image forming apparatus and a mobile device. However, a typical wireless connection process is complicated, is inconvenient, and demands users to have preliminary knowledge of a wireless network.

In addition, since a mobile application provided on a mobile device to use an image forming apparatus uses an environment different from an existing PC environment, a user who is not used to manipulating the mobile application may find it difficult to use the image forming apparatus.

SUMMARY OF THE INVENTION

One or more exemplary embodiments of the present general inventive concept include a system and method of allowing a user to conveniently and easily perform mobile printing by using near field communication (NFC).

Additional features and utilities of the present general inventive concept will be set forth in part in the description which follows and, in part, will be obvious from the description, or may be learned by practice of the general inventive concept.

Exemplary embodiments of the present general inventive concept provide a method of mobile printing using near field communication (NFC), the method including executing a mobile printing application installed in a mobile device, setting a wireless connection for data transmission between the mobile device and an image forming apparatus by performing NFC tagging on the image forming apparatus with the mobile device, and automatically performing a function corresponding to a status of the mobile printing application when NFC tagging is performed.

The mobile printing application may include a home menu to manage the image forming apparatus, and if NFC tagging is performed while the home menu is selected, the automatic performing of the function may include receiving status information from the image forming apparatus at the mobile device, and displaying the status information on a screen.

The mobile device may cyclically receive the status information from the image forming apparatus so as to update the status information.

The method may further include changing settings of the image forming apparatus by using the mobile printing application.

The changing of the settings of the image forming apparatus may include displaying at the mobile device a screen to manage the setting of the image forming apparatus according to a selection of a user, and transmitting from the mobile device a command corresponding to the input to the image forming apparatus via the set wireless connection, if an input to change the setting of the image forming apparatus is received from the user.

If the mobile printing application is executed, the home menu may be selected by default.

The image forming apparatus wirelessly connected via NFC tagging while the home menu is selected on the mobile printing application may be set as an apparatus to perform all mobile printing operations.

The setting of the wireless connection may include receiving at the mobile device information of the image forming apparatus, which is stored in the NFC tag by performing NFC tagging on the image forming apparatus, and setting a Wi-Fi Direct connection between the mobile device and the image forming apparatus by using the received information of the image forming apparatus.

The information of the image forming apparatus may include a media access control (MAC) address, and the setting of the Wi-Fi Direct connection may include searching for an apparatus corresponding to the received MAC address, transmitting a request for the Wi-Fi Direct connection to the image forming apparatus if the image forming apparatus is found, and accepting the Wi-Fi Direct connection at the image forming apparatus.

The information of the image forming apparatus may further include a personal identification number (PIN), the transmitting of the request for the Wi-Fi Direct connection may include transmitting the received PIN, and the accepting by the image forming apparatus of the Wi-Fi Direct connection may include the image forming apparatus accepting the Wi-Fi Direct connection if it is determined that the PIN received from the mobile device is identical to the PIN set to the image forming apparatus.

A non-transitory computer-readable recording medium may contain computer-readable codes as a program to execute the method.

Exemplary embodiments of the present general inventive concept also provide a system of mobile printing using near field communication (NFC), the system includes a mobile device in and on which a mobile printing application is installed and executed, and an image forming apparatus wirelessly connected to the mobile device via NFC tagging so as to perform mobile printing. The mobile device and the image forming apparatus perform a function corresponding to a status of the mobile printing application when NFC tagging is performed.

The mobile printing application may include a home menu to manage the image forming apparatus, and if NFC tagging is performed while the home menu is selected, the mobile device may request the image forming apparatus for status information and receive and display the status information on a screen.

The mobile device may cyclically request the image forming apparatus for the status information so as to receive and display the status information on the screen.

Settings of the image forming apparatus may be changeable by using the mobile printing application.

The mobile device may display a screen to manage the settings of the image forming apparatus according to a selection of a user and, if an input to change the settings of the image forming apparatus is received from the user, transmit a command corresponding to the input to the image forming apparatus via the set wireless connection.

If the mobile printing application is executed on the mobile device, the home menu may be selected by default.

The image forming apparatus wirelessly connected via NFC tagging while the home menu is selected on the mobile printing application may be set as an apparatus to perform all mobile printing operations.

The mobile device may approach an NFC tag attached to the image forming apparatus so as to receive information of the image forming apparatus, which is stored in the NFC tag, and set a Wi-Fi Direct connection to the image forming apparatus by using the received information of the image forming apparatus.

The information of the image forming apparatus may include a media access control (MAC) address, the mobile device may search for an apparatus corresponding to the received MAC address, and request the image forming apparatus for the Wi-Fi Direct connection if the image forming apparatus is found, and the image forming apparatus may accept the Wi-Fi Direct connection.

The information of the image forming apparatus may further include a personal identification number (PIN), the mobile device may transmit the received PIN while requesting the Wi-Fi direct connection, and the image forming apparatus may accept the Wi-Fi Direct connection if it is determined that the PIN received from the mobile device is identical to the PIN set to the image forming apparatus.

Exemplary embodiments of the present general inventive concept also provide a method of mobile printing using near field communication (NFC), the method including displaying a first image on a screen of a mobile device, the first image corresponding to a mobile printing application installed in the mobile device and including a status of the mobile printing application, and displaying a second image on the screen when an NFC tagging is performed on the image forming apparatus by the mobile device, the second image corresponding to a function of an image forming apparatus performed automatically according to the status of the mobile printing application when the NFC tagging is performed.

The first image may include an area to receive a user input to set up a wireless connection between the mobile device and the image forming apparatus. Performing the function of the image forming apparatus may include establishing the wireless connection set up according to the user input on the first image.

The wireless connection may be established according to connection information received from the NFC tagging.

Performing the function of the image forming apparatus may include receiving current status information of the image forming apparatus from the image forming apparatus after the NFC tagging is performed. The second screen may display the received current status information of the image forming apparatus.

The second screen may be a default screen of the mobile printing application after the NFC tagging is performed.

The second screen may further include information of the image forming apparatus received when the NFC tagging is performed.

The method may further include configuring the status of the mobile printing application by changing the first image prior to the NFC tagging.

The method may further include displaying a third image on the screen prior to displaying the first image, the third image indicating a state of a wireless function of the mobile device.

The first image may further correspond to a status of a wireless connection between the mobile device and the image forming apparatus.

The method may further include searching for the image forming apparatus according to an input on the first image.

The method may further include connecting the mobile device to the image forming apparatus prior to performing the NFC tagging, checking a version of firmware of the image forming apparatus at the mobile device, and updating the firmware to support a wireless connection via automatic transmission of a Personal Identification Number (PIN).

Updating the firmware may include receiving an updated version of the firmware at the mobile device, and transmitting the updated version of the firmware from the mobile device to the image forming apparatus.

Updating the firmware may include requesting from the mobile device for a server to transmit an updated version of the firmware to the image forming apparatus.

Exemplary embodiments of the present general inventive concept also provide a mobile device to perform mobile printing using near field communication (NFC), the mobile device including a screen, and a control unit to control the screen to display a first image, the first image corresponding to a mobile printing application installed in the mobile device and including a status of the mobile printing application, and to control the screen to display a second image when an NFC tagging is performed on the image forming apparatus by the mobile device, the second image corresponding to a function of an image forming apparatus performed automatically according to the status of the mobile printing application when the NFC tagging is performed.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
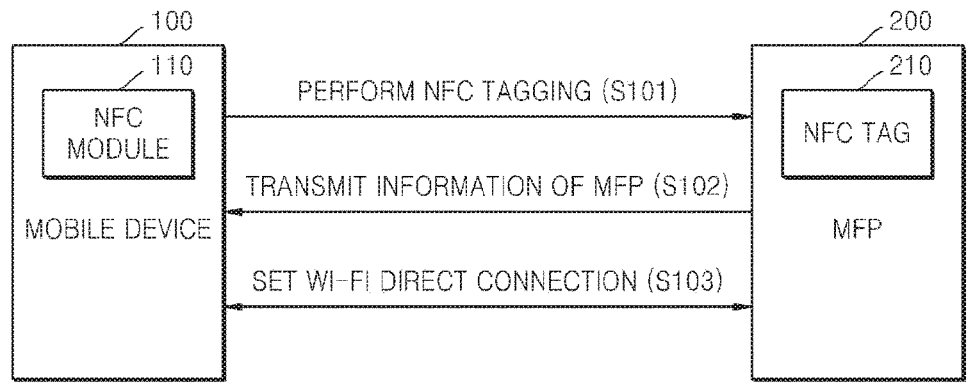
FIG. 1 is a diagram illustrating a system of mobile printing using near field communication (NFC), according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Initially, a technology of mobile printing using near field communication (NFC) will be described.

Basically, when a mobile device 100 having an NFC module 110 approaches a multifunction printer (MFP 200) and performs NFC tagging for short-distance wireless communication, the mobile device 100 obtains information of the MFP 200 and sets a wireless connection for data transmission and reception to the MFP 200 by using the obtained information. In this case, the wireless connection for data transmission and reception between the mobile device and the MFP 200 may be set by using, for example, Bluetooth, Wi-Fi, or Wi-Fi Direct. In the following description and exemplary embodiments described herein, it is assumed that Wi-Fi Direct is used. However, it will be understood that any other short-distance wireless communication may be used instead of Wi-Fi Direct without departing from the present general inventive concept.

If a Wi-Fi Direct connection is set between the mobile device 100 and the MFP 200, the mobile device 100 transmits to the MFP 200 via the Wi-Fi Direct connection an image data file or a command to perform an operation, and the MFP 200 performs an image forming operation according to the received command. In this case, besides the MFP 200, various image forming apparatuses such as for example a printer, a scanner, and a fax machine may also be used. However, it is assumed hereinafter that an MFP 200 is used.

FIG. 1 is a diagram illustrating a system of mobile printing using NFC, according to an exemplary embodiment of the present general inventive concept. A mobile device 100 includes an NFC module 110, and an MFP 200 includes an NFC tag 210. In general, for cost reduction, the NFC tag 210 included in the MFP 200 supports passive NFC. In this case, the NFC tag 210 stores information of the MFP 200, for example, a media access control (MAC) address and a device name of the MFP 200. Since passive NFC allows only reading of information stored in the NFC tag 210, the operation of NFC tagging involves a one-way communication, in which an NFC module reads information from an NFC tag. Accordingly, if NFC tagging is performed (operation S101), the mobile device 100 receives the information of the MFP 200 (operation S102), which is stored in the NFC tag 210 of the MFP 200, and sets a Wi-Fi Direct connection for data communication to the MFP 200 by using the received information of the MFP 200 (operation S103).

Figure 2:
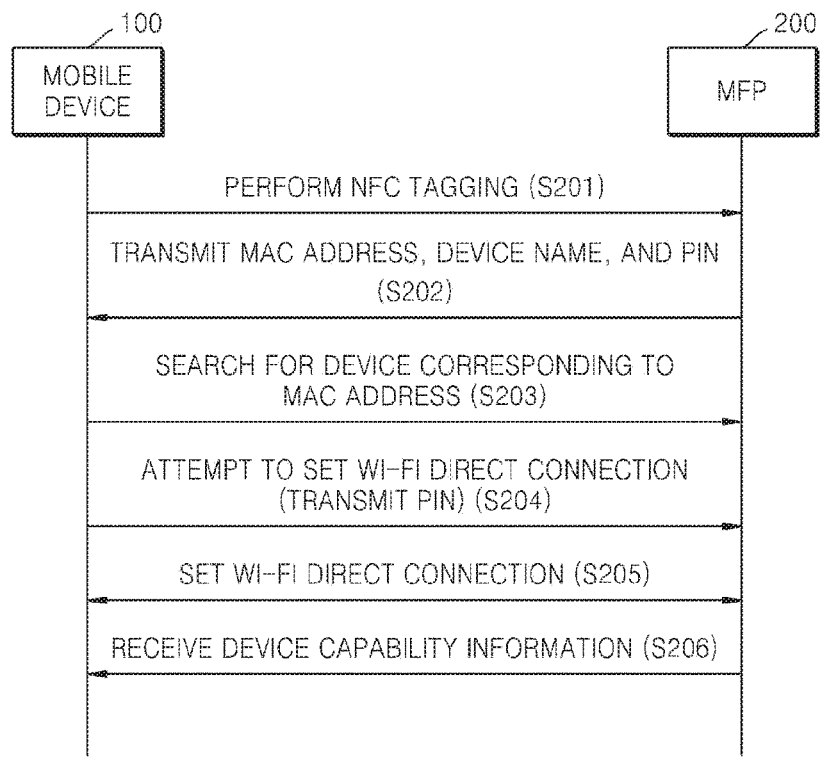
FIG. 2 is a diagram illustrating a detailed process of setting a Wi-Fi Direct connection between a mobile device and a multifunction printer (MFP) via NFC tagging, according to an exemplary embodiment of the present general inventive concept.

FIG. 2 is a diagram illustrating a detailed process of setting a Wi-Fi Direct connection between a mobile device 100 and an MFP 200 via NFC tagging, according to an exemplary embodiment of the present general inventive concept. If the mobile device 100 performs an NFC-tagging on the MFP 200 (operation S201), the mobile device 100 receives a MAC address, a device name, and a personal identification number (PIN) of the MFP 200 from an NFC tag 210 attached to the MFP 200 (operation S202). The mobile device 100 searches for a device having a MAC address identical to the MAC address received from the NFC tag (operation S203). If the MFP 200 to which the NFC tag 210 is attached is found, the mobile device 100 attempts to set a Wi-Fi Direct connection to the found MFP 200 (operation S204).

In this case, according to the Wi-Fi Direct standards, the Wi-Fi Direct connection may be set if a user presses a Wi-Fi Protected Setup (WPS) button included in the MFP 200, or inputs a PIN via an input interface of the MFP 200. Alternatively, the Wi-Fi Direct connection may be automatically set even if a user neither presses a WPS button nor inputs a PIN.

In more detail, if a PIN required for the Wi-Fi Direct connection is previously encrypted and stored in the NFC tag 210 attached to the MFP 200, the mobile device 100 may receive the encrypted PIN from the NFC tag 210 when NFC tagging is performed, and may transmit the PIN to the MFP 200 when the Wi-Fi Direct connection is attempted to be set, thereby automatically setting the Wi-Fi Direct connection. However, since automatic transmission of a PIN does not follow the Wi-Fi Direct standards, for the above-described method, firmware of the MFP 200 may need to be updated. Methods of updating firmware of the MFP 200 will be described in detail below with reference to FIGS. 14-18.

If the Wi-Fi Direct connection is set between the mobile device 100 and the MFP 200 (operation S205), the mobile device 100 receives from the MFP 200 device capability information indicating available operations (operation S206).

If the Wi-Fi Direct connection is set between the mobile device 100 and the MFP 200 as described above, the mobile device 100 may transmit via the Wi-Fi Direct connection to the MFP 200 a command to perform an image forming operation such as print, scan, or fax operations, or image data to be printed, such that mobile printing may be performed. Also, the mobile device 100 may receive via the Wi-Fi Direct connection from the MFP 200 data or a command required for mobile printing.

A mobile printing application to control mobile printing may be installed in the mobile device 100. Such a mobile printing application is generally developed by a manufacturer of the MFP 200 and is provided to users. A mobile printing application will now be described in detail.

Figure 3:
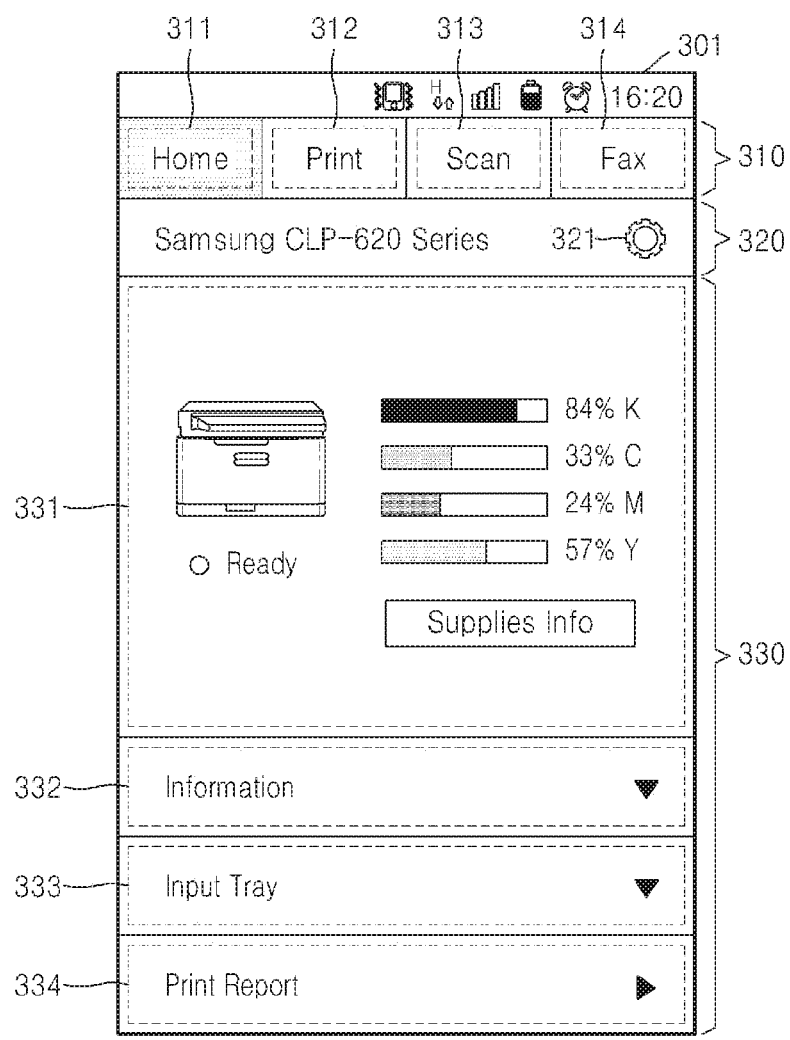
FIG. 3 is a diagram illustrating a screen of a mobile printing application, according to an exemplary embodiment of the present general inventive concept.

FIG. 3 is a diagram illustrating a screen 301 of a mobile printing application, according to an exemplary embodiment of the present general inventive concept. The screen 301 may be a default screen that is displayed when the Wi-Fi Direct connection is established between the mobile device 100 and the MFP 200. Referring to FIG. 3, the screen 301 of the mobile printing application may include a main menu display area 310, a sub tap area 320, and a content display area 330.

The main menu display area 310 displays a plurality of main menus, such as for example home, print, scan, and fax menus 311, 312, 313, and 314. Functions of the main menus will be described in detail below. The sub tap area 320 displays a device name of an MFP 200 currently connected to a mobile device 100. If no MFP 200 is currently connected, a message such as "No Selected Printer" may be displayed. A device settings button 321 in the sub tap area 320 is a button to activate a menu to check and manage settings of the connected MFP 200. A method of managing settings of an MFP 200 by using the device settings button 321 will be described in detail below.

The content display area 330 displays contents corresponding to a selected main menu. In FIG. 3, since the home menu 311 is selected from among the main menus, the content display area 330 displays a status screen 331 of the MFP 200, an information button 332, an input tray button 333, and a print report button 334. Detailed descriptions thereof will be provided below.

A method of utilizing a mobile printing application in a system of mobile printing using NFC will now be described in detail.

Figure 4A:
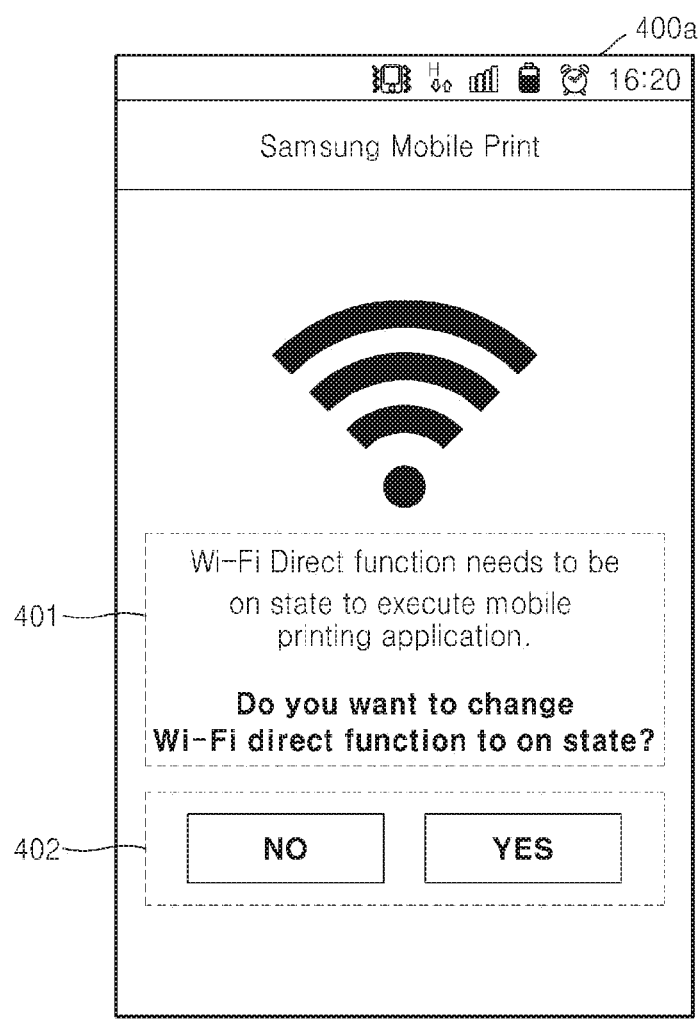
FIGS. 4A, 4B, and 4C are diagrams illustrating screens of a mobile printing application displayed in order to connect a mobile device and an MFP, according to an exemplary embodiment of the present general inventive concept.
Figure 4B:
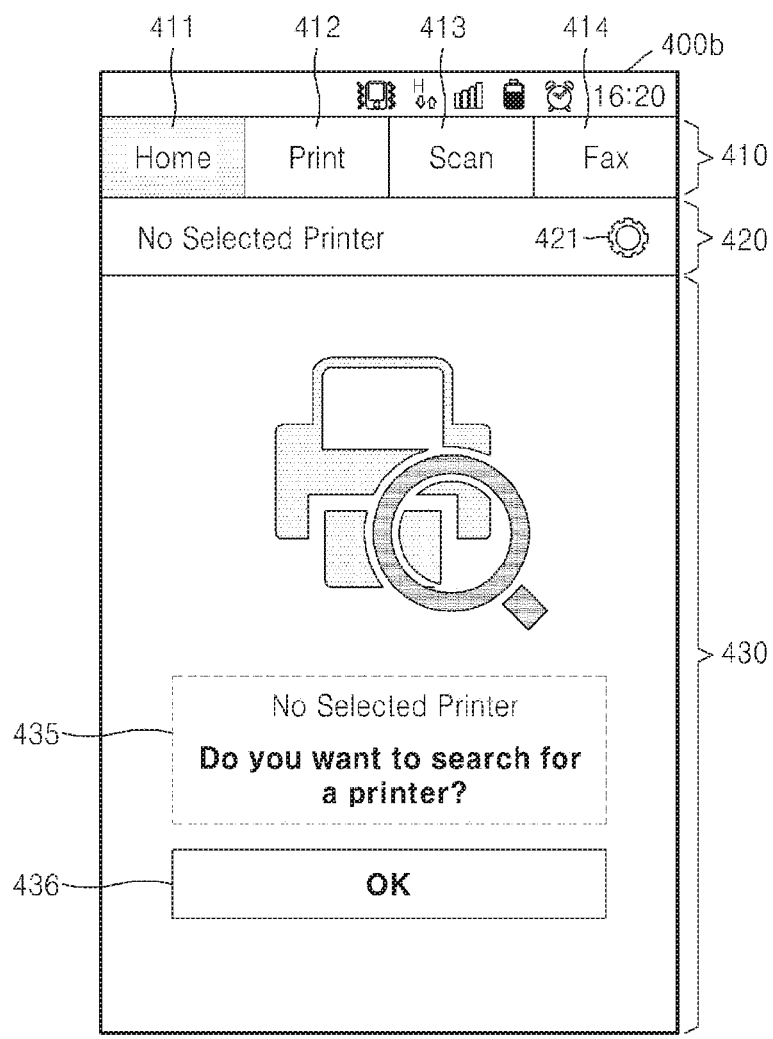
Figure 4C:
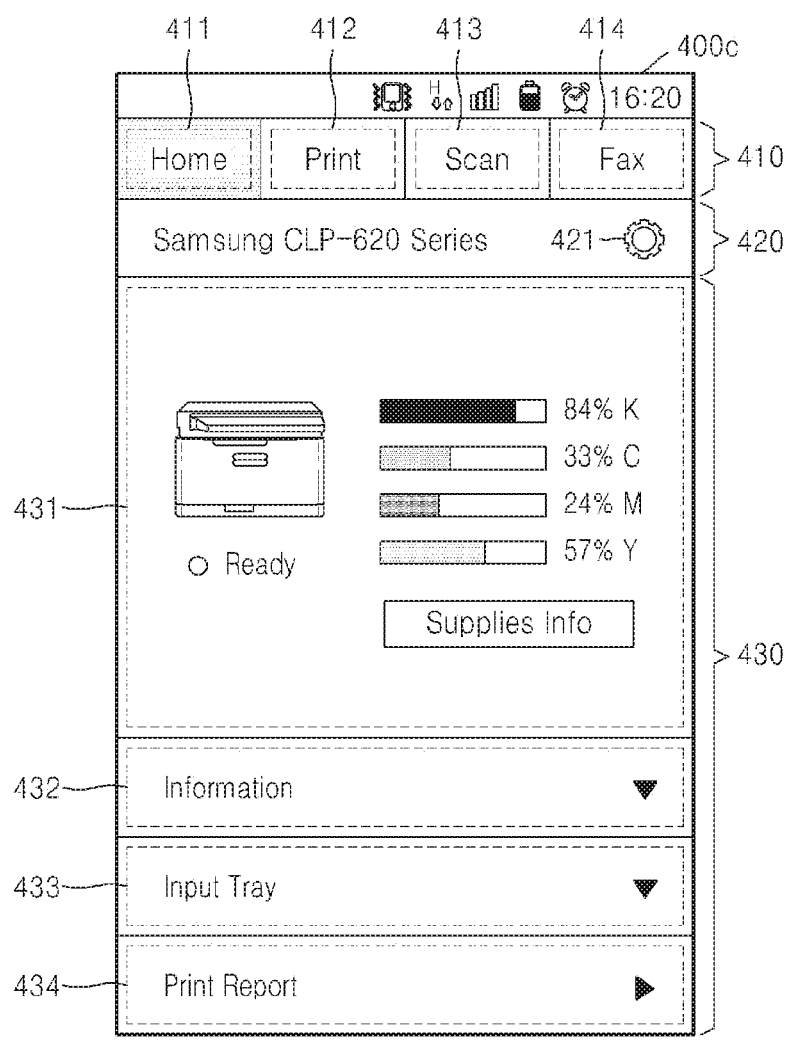

FIGS. 4A through 4C are diagrams illustrating screens 400a through 400c of a mobile printing application displayed in order to connect a mobile device 100 and an MFP 200, according to an exemplary embodiment of the present general inventive concept. Elements 410-414, 420-421, and 430-434 as illustrated in FIGS. 4A through 4C are the same as corresponding elements 310-314, 320-321, and 330-334, already described above with reference to FIG. 3, and so a detailed description thereof will be omitted.

If a mobile printing application is executed on the mobile device 100, the mobile device 100 determines whether a Wi-Fi function is on. If the Wi-Fi function is off, the screen 400a of FIG. 4A is displayed. Area 401 of FIG. 4A displays a message indicating that the Wi-Fi function should be on to use the mobile printing application, and area 402 displays a button to select an on or off state of the Wi-Fi function. Otherwise, if the Wi-Fi function of the mobile device 100 is already on, the screen 400a of FIG. 4A is not displayed and the screen 400b of FIG. 4B is displayed.

If a user selects "Yes" or "No" on the screen 400a of FIG. 4A, the screen 400b of FIG. 4B is displayed while the Wi-Fi function is on or off. In this case, if the user selects "No" and thus the Wi-Fi function is off, the message displayed on area 401 may be displayed again later when the Wi-Fi function should be on.

On the screen 400b of FIG. 4B, since no MFP 200 is currently connected to the mobile device 100, a sub tap 420 displays a message such as "No Selected Printer". Area 435 of a content display area 430 displays a message to ask whether to search for a printer (including for example an MFP 200), and area 436 displays a button to confirm to search for a printer (MFP 200).

On the screen 400b of FIG. 4B, if a user touches the button displayed on area 432, the mobile device 100 searches for a printer. In this case, the user may select an MFP 200 to be connected, on an MFP 200 list previously stored in the mobile device 100, or by approaching and performing NFC tagging on the MFP 200. A process of performing NFC tagging on and setting a Wi-Fi Direct connection to an MFP 200 has already been described above in detail.

FIG. 4C illustrates a display screen 400c of the mobile device 100 when a Wi-Fi Direct connection is set between the mobile device 100 and an MFP 200. A main menu display area 410 displays that a home menu 411 is currently selected from among main menus, and a sub tap area 420 displays a device name of a currently connected MFP 200. A content display area 430 displays contents corresponding to the selected main menu.

From among the main menus, the home menu 411 is a menu to allow a user to check and manage information of the MFP 200, for example, its status and settings. A mobile printing application according to an exemplary embodiment of the present general inventive concept increases user convenience by including the home menu 411 as a main menu so as to allow the user to check information of an MFP 200 and to manage the MFP 200 by using the mobile printing application. From among the main menus, print, scan, and fax menus 412, 413, and 414 are menus to perform print, scan, and fax operations, respectively. Screens of the mobile printing application when these menus are selected will be described below.

On the screen 400c of FIG. 4C, since the home menu 411 is selected from among the main menus, area 431 displays a status of the connected MFP 200, area 432 displays an information button, area 433 displays an input tray button, and area 434 displays a print report button.

According to another exemplary embodiment of the present general inventive concept, a function may be automatically performed according to NFC tagging. In other words, if a mobile device performs NFC tagging on an MFP 200, a function corresponding to a status of a mobile printing application at a point of time when NFC tagging is performed may be automatically performed. For example, a command corresponding to a menu or a file selected on the mobile printing application when NFC tagging is performed may be transmitted to the MFP 200. In other words, a command corresponding to a main menu of the mobile printing application, which is selected when NFC tagging is performed, for example, the home, print, scan, or fax menu 411, 412, 413, or 414, may be transmitted to the MFP 200.

Accordingly, as illustrated in FIG. 4C, if NFC tagging is performed while the home menu 411 is selected from among the main menus, the mobile device 100 sets a Wi-Fi Direct connection to the MFP 200 and then automatically transmits to the MFP 200 a command requesting status information, and the MFP 200 transmits the status information to the mobile device 100 in response to the request. The mobile device 100 receives and displays the status information on a screen so as to allow a user to check the status of the MFP. In this case, as illustrated in FIG. 4C, the displayed status information of the MFP 200 may include, for example, a graphic image of the MFP 200, a ready or error status, and a toner indicator. If the user requests other information via a button input, the other information may be displayed. Also, if the Wi-Fi Direct connection is set between the mobile device 100 and the MFP 200 via NFC tagging while the home menu 411 is selected, the connected MFP 200 is set as a device to perform print, scan, and fax operations.

The status information of the MFP 200 displayed on the mobile device 100 may be updated cyclically or at a certain point of time. For example, while the mobile device 100 and the MFP 200 maintain the Wi-Fi Direct connection, the status information may be repeatedly updated in a certain cycle and may be displayed on the mobile device 100. Alternatively, the status information of the MFP 200 may be received and updated only when the mobile device 100 performs NFC tagging on the MFP 200.

Cases when the other menus are selected will now be described. If NFC tagging is performed while the print menu 412 is selected on the mobile printing application, the mobile device 100 sets a Wi-Fi Direct connection to the MFP 200 and sets the connected MFP 200 as an MFP for a print operation. Alternatively, if NFC tagging is performed while the print menu 412 is selected on the mobile printing application and a certain image is displayed on a screen of the mobile device 100, the mobile device 100 may automatically transmit to the MFP 200 a data file of the image displayed on the screen and a command requesting to print the image, such that a print operation may be automatically performed.

Likewise, if NFC tagging is performed while the scan menu 413 or the fax menu 414 is selected from among the main menus of the mobile printing application, a preset function may be automatically performed.

The mobile device 100 may be set in such a way that the home menu 411 is selected by default when the mobile printing application is executed. Alternatively, if the mobile device 100 performs NFC tagging on the MFP 200 while the mobile printing application is not executed, the mobile printing application may be automatically executed. In this case, the mobile device 100 may be set in such a way that the home menu 411 is selected from among main menus and thus the status information of the MFP 200 is displayed. In other words, a user may execute the mobile printing application and may check the status information of the MFP 200 by merely allowing the mobile device 100 to perform NFC tagging on an NFC tag 210 of the MFP 200.

An operation when a home menu is selected from among main menus of a mobile printing application in a system of mobile printing using NFC, according to an exemplary embodiment of the present general inventive concept, will now be described in detail. FIG. 5A through 5E are diagrams illustrating various screens 500a through 500e when a home menu is selected from among main menus of a mobile printing application, according to an exemplary embodiment of the present general inventive concept. Elements 510-514, 520-521, and 530-534 as illustrated in FIGS. 5A through 5E are the same as corresponding elements 310-314, 320-321, and 330-334, already described above with reference to FIG. 3, and so a detailed description thereof will be omitted.

Figure 5A:
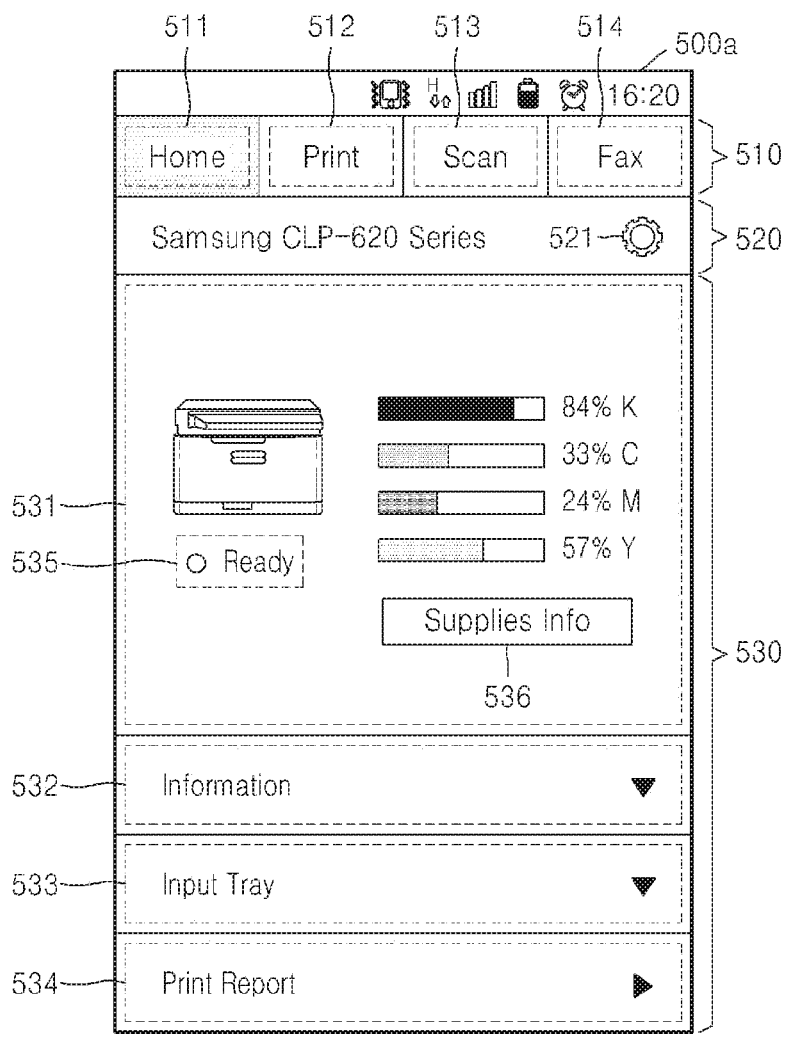
FIGS. 5A, 5B, 5C, 5D, and 5E are diagrams illustrating various screens when a home menu is selected from among main menus of a mobile printing application, according to an exemplary embodiment of the present general inventive concept.
Figure 5B:
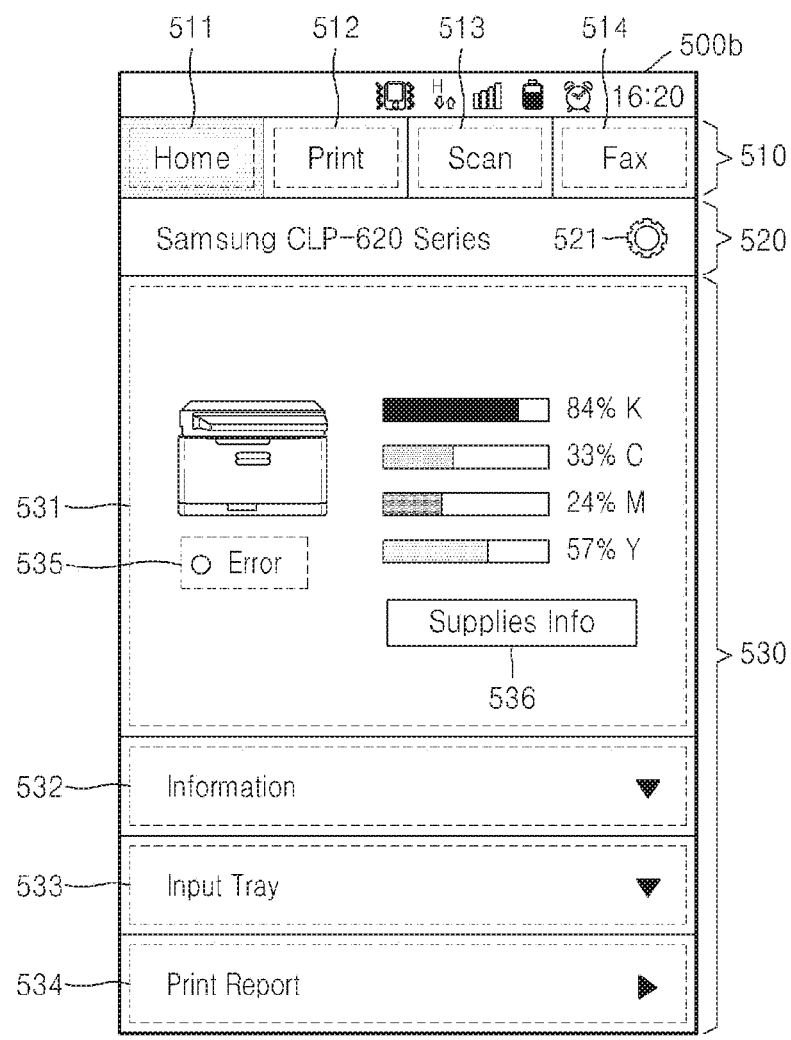
Figure 5C:
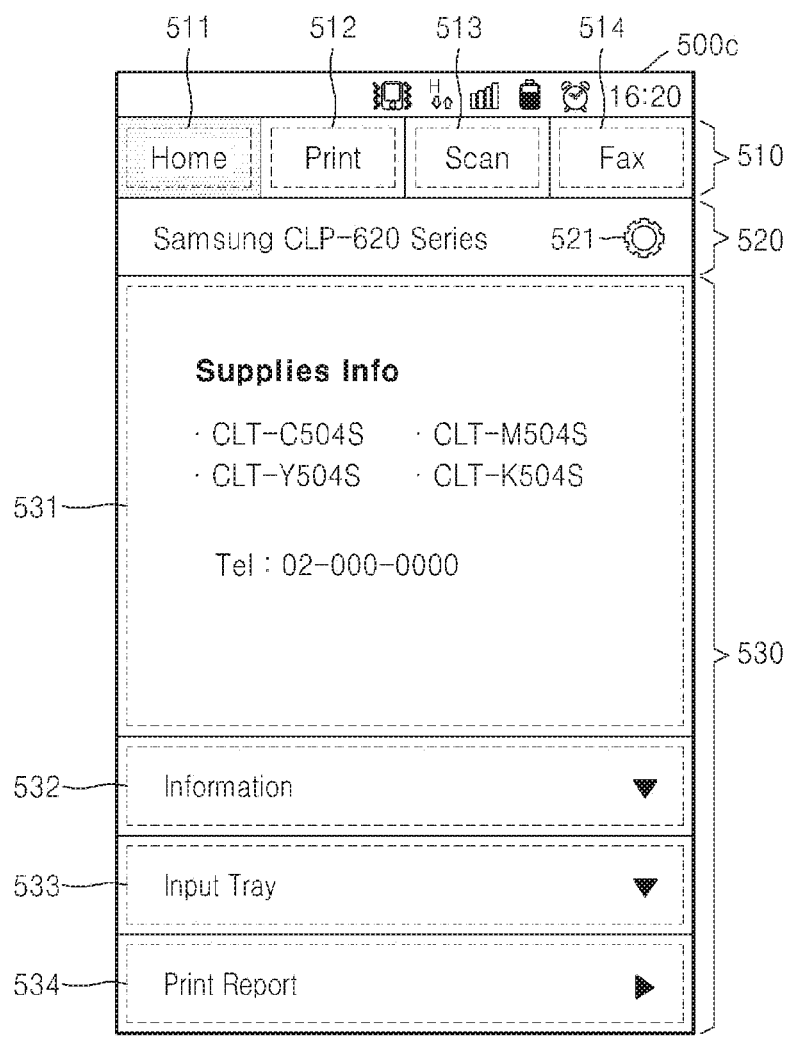

FIG. 5A illustrates a screen 500a when a home menu 511 is selected from among main menus of a mobile printing application, according to an exemplary embodiment of the present general inventive concept. The screen 500a illustrated in FIG. 5A may be a default screen when the home menu 511 is selected. As described above in relation to FIG. 4C, a content display area 530 displays a status of a connected MFP 200. Specifically, in this case, area 535 displays a current status of the MFP 200 as a ready status or an error status. If the MFP 200 is in a ready status and thus is enabled to perform an operation such as a print operation, "Ready" is displayed as illustrated in FIG. 5A. If the MFP 200 has an error and thus is unable to perform an operation, "Error" is displayed as illustrated in screen 500b, illustrated in FIG. 5B.

A user may obtain information about supplies. If the user touches a supplies information button 536 of FIG. 5A, a mobile device 100 may display a screen 500c of FIG. 5C, and area 531 may display model names of toners installed in the MFP 200, and contact information of a place where the toners may be purchased.

Figure 5D:
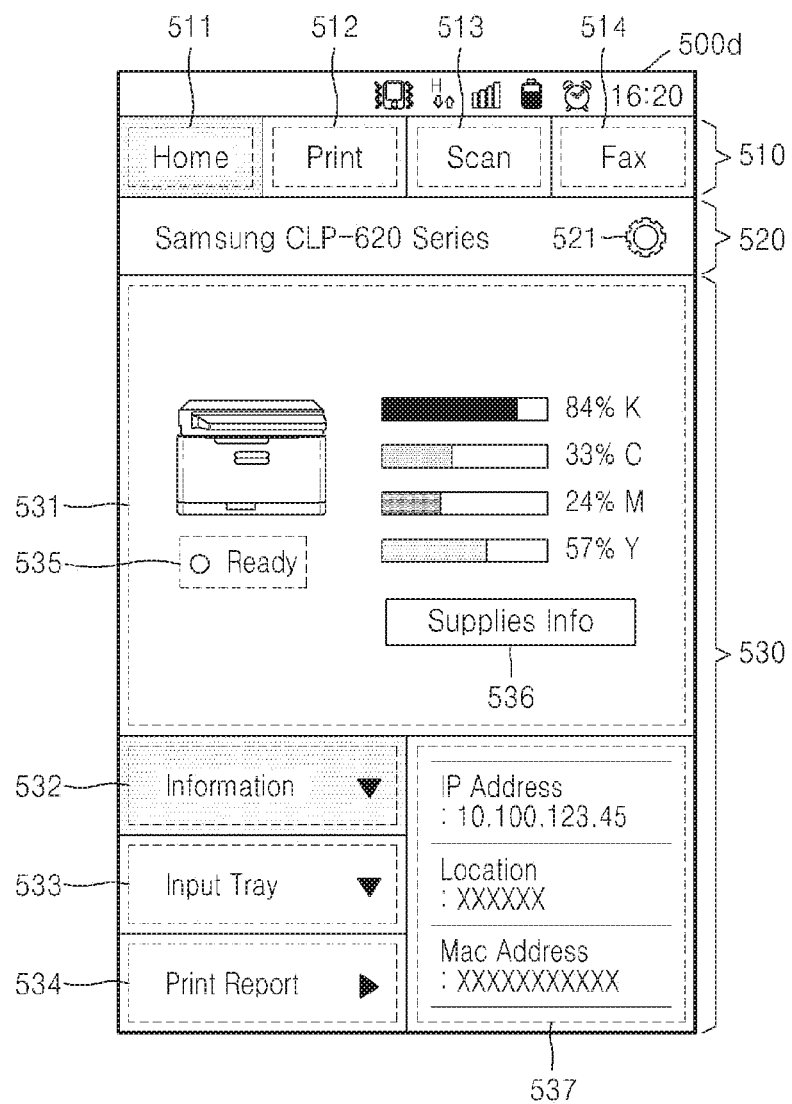
Figure 5E:
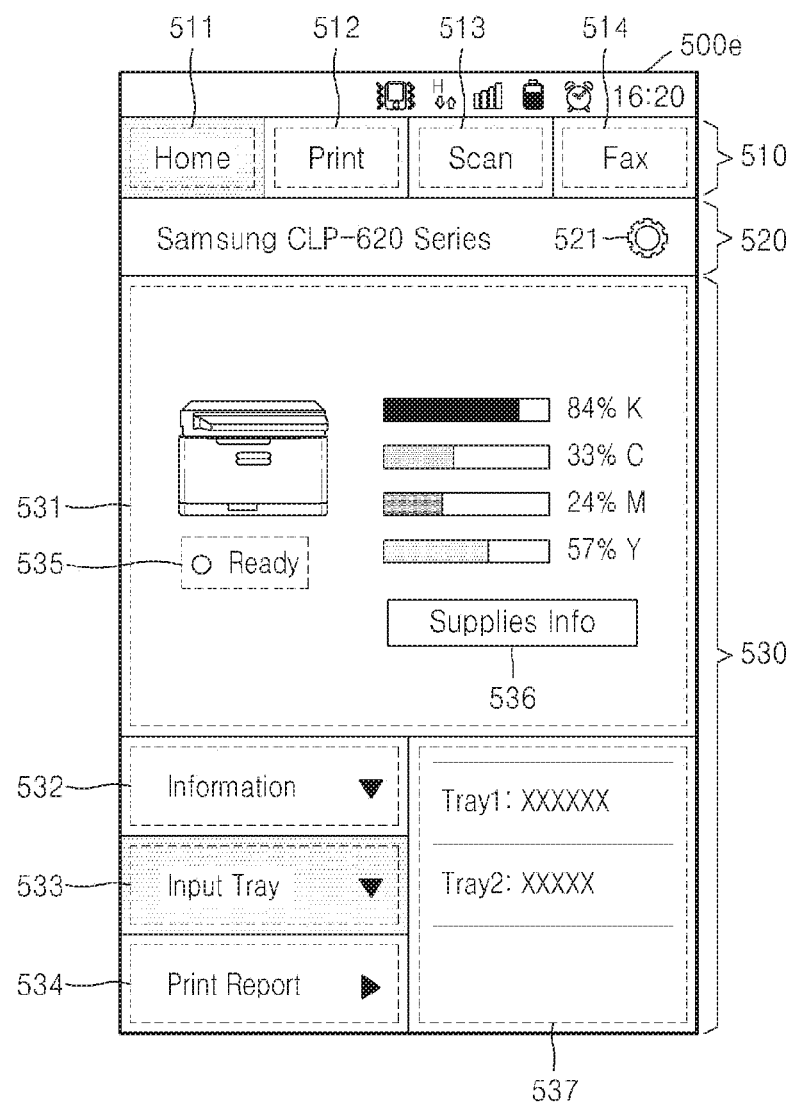

If the user touches an information button 532 in FIG. 5A, as illustrated in screen 500d, illustrated in FIG. 5D, information of the MFP 200, for example, an IP address, a location, and a MAC address of the MFP 200, is displayed in area 537 of the content display area 530. Also, if the user touches an input tray button 533 in FIG. 5A, as illustrated in screen 500e, illustrated in FIG. 5E, information about each tray is displayed in area 537. Furthermore, if the user touches a print report button 534 in FIG. 5A, a sub menu (not illustrated) to print a system report of the MFP 200 is displayed.

By using a mobile printing application according to an exemplary embodiment of the present general inventive concept, a user may check status information of an MFP 200 and may manage various settings of the MFP 200. A method of managing settings of an MFP 200 by using a mobile printing application, according to an exemplary embodiment of the present general inventive concept, will now be described in detail.

Figure 6A:
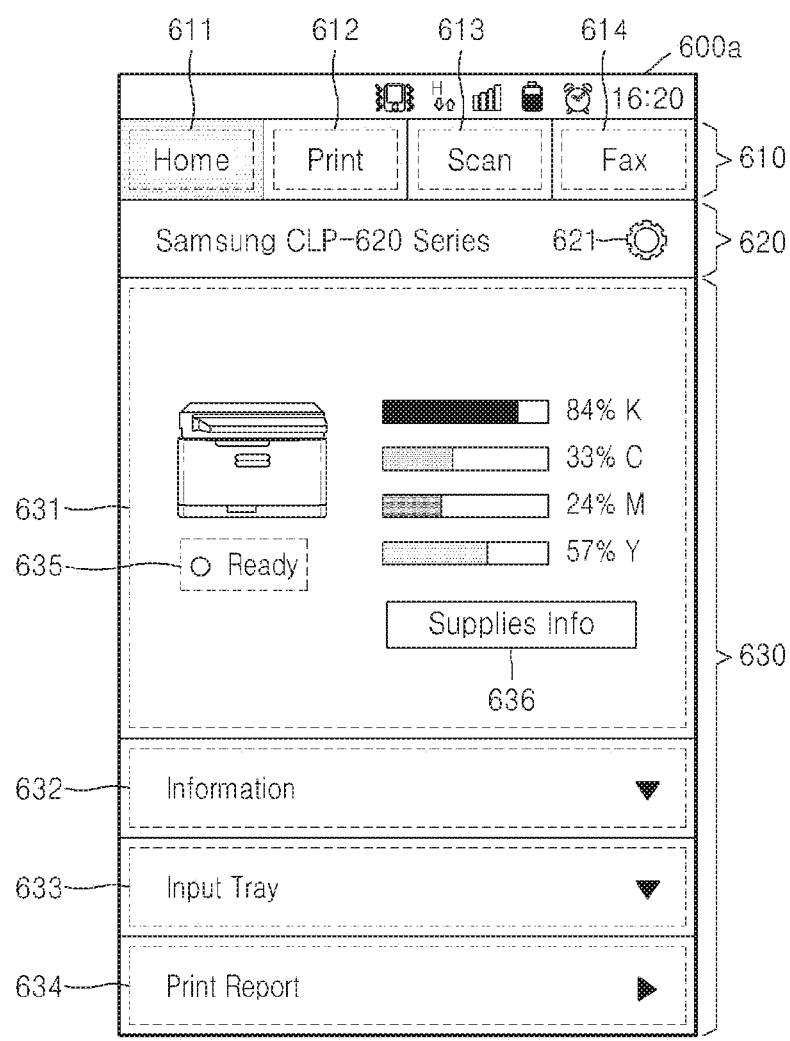
FIGS. 6A, 6B, and 6C illustrate screens to describe a method of managing settings of an MFP by using a mobile printing application, according to an exemplary embodiment of the present general inventive concept.
Figure 6B:
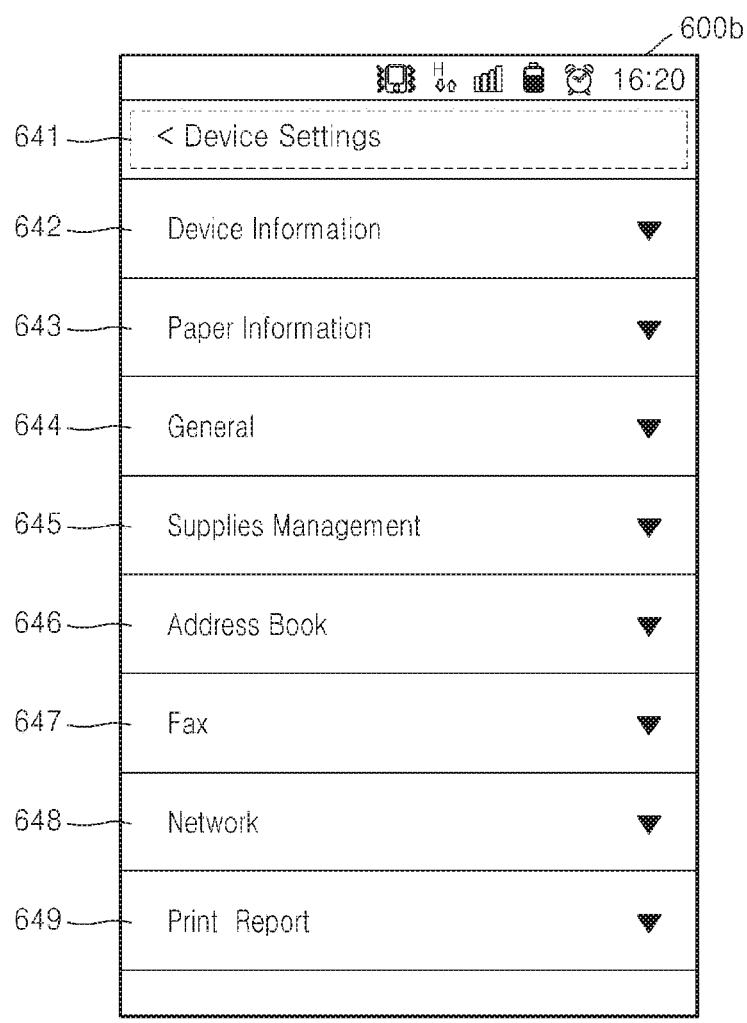
Figure 6C:
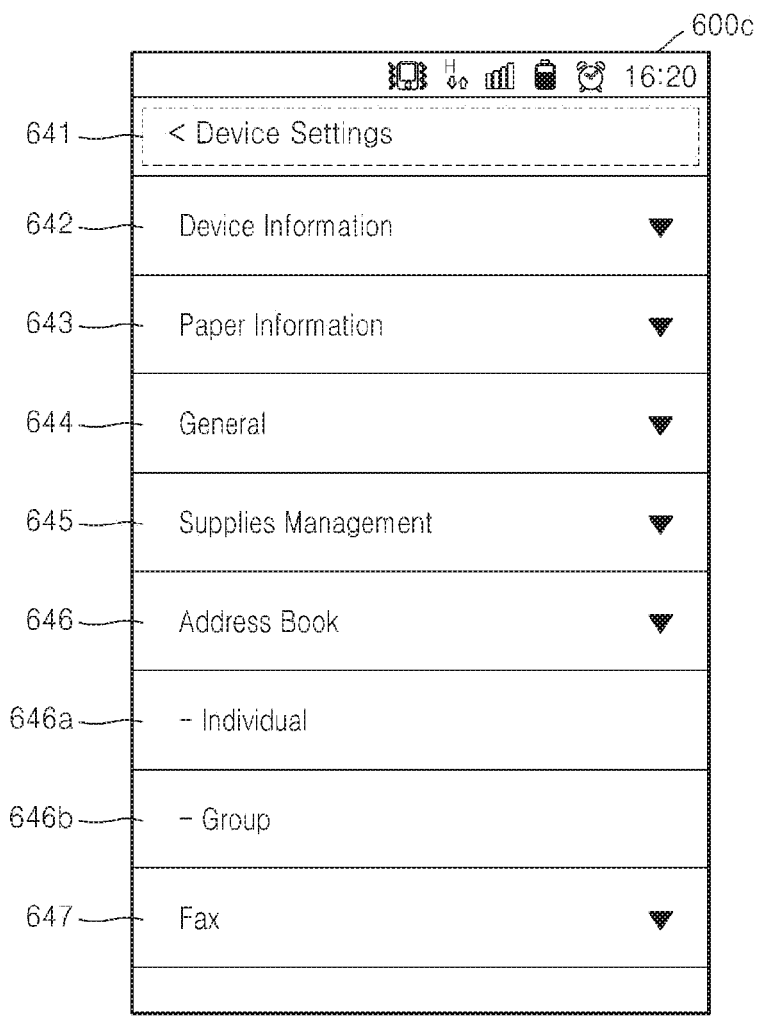

FIGS. 6A through 6C illustrate screens 600a through 600c to describe a method of managing settings of an MFP 200 by using a mobile printing application, according to an exemplary embodiment of the present general inventive concept. In order to manage settings of an MFP 200 on a screen 600a corresponding to a home menu 611 of FIG. 6A, a user may activate a device settings menu by touching a device settings button 621 included in sub tap area 620. The screen 600a illustrated in FIG. 6A may be a default screen when the home menu 611 is selected. Elements 610-614, 620-621, and 630-634 as illustrated in FIG. 6A are the same as corresponding elements 310-314, 320-321, and 330-334, already described above with reference to FIG. 3. Similarly, element 635 as illustrated in FIG. 6A is the same as the corresponding element 535, already described above with reference to FIG. 5A, and so a detailed description thereof will be omitted.

FIG. 6B illustrates a screen 600b of a mobile device 100 when the device settings menu is activated. An area 641 displays a message indicating that the device settings menu is currently activated. The mobile device 100 may be set in such a way that, if a user touches the area 641, the screen 600b returns to the previous screen 600a of FIG. 6A. The user may check and change various settings of an MFP 200 by touching areas 642 through 649 of FIG. 6B. For example, device information of the MFP 200 may be checked by touching the area 642, or paper information may be checked by touching the area 643. Also, general settings of the MFP 200, e.g., power save, default paper size, and eco default mode settings, may be checked and changed by touching the area 644. Supplies of the MFP 200 may be managed by touching the area 645, and an address book stored in the MFP 200 may be edited by touching the area 646. Fax-related settings may be checked and changed by touching the area 647, and network-related settings may be made by touching the area 648. Furthermore, a print report operation to print a system report of the MFP 200 may be performed by touching the area 649.

FIG. 6C illustrates a screen 600c in an example when a sub menu to manage an address book of an MFP 200 is activated by touching the area 646. Referring to FIG. 6C, if a user touches the area 646, a sub menu to edit the address book by individuals, e.g., "Individual" 646a, and a sub menu to edit the address book by groups, e.g., "Group" 646b, are displayed between the areas 646 and 647. The user may select one of the sub menus to activate a menu to edit the address book by individuals or groups.

Figure 7A:
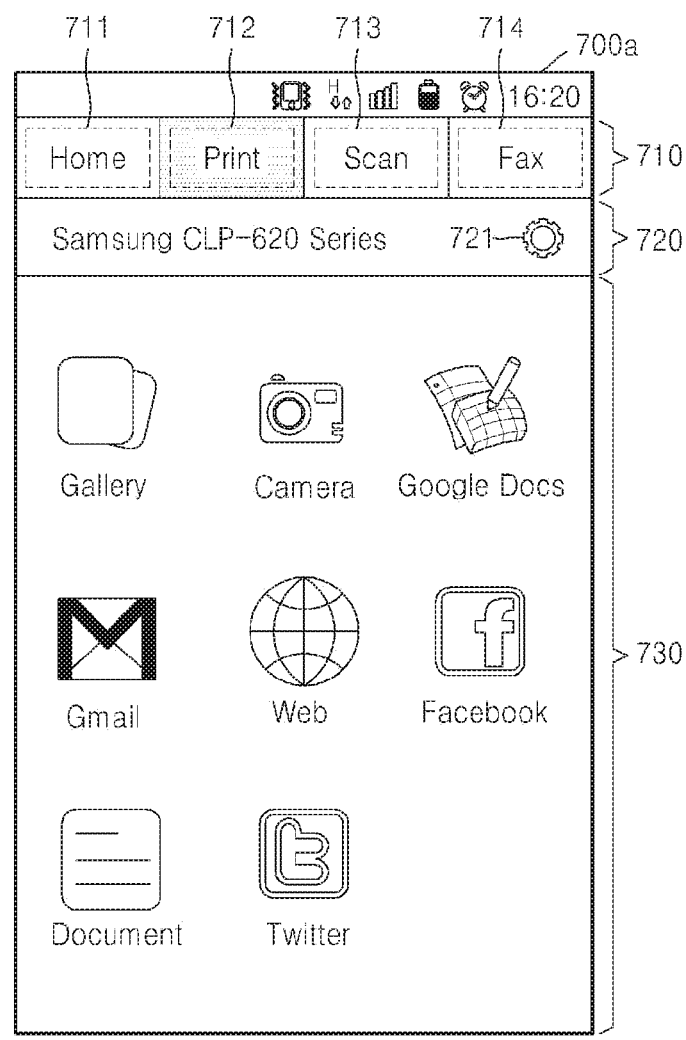
FIGS. 7A, 7B, and 7C are diagrams illustrating screens when print, scan, and fax menus are selected from among main menus of a mobile printing application, according to an exemplary embodiment of the present general inventive concept.
Figure 7B:
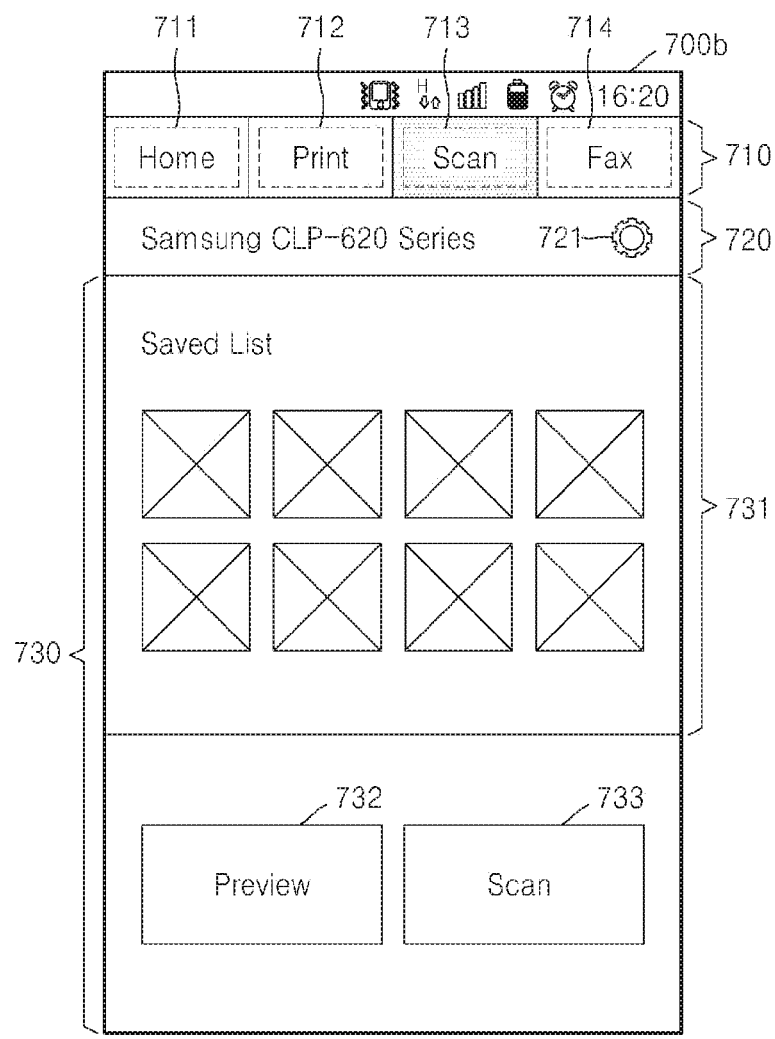
Figure 7C:
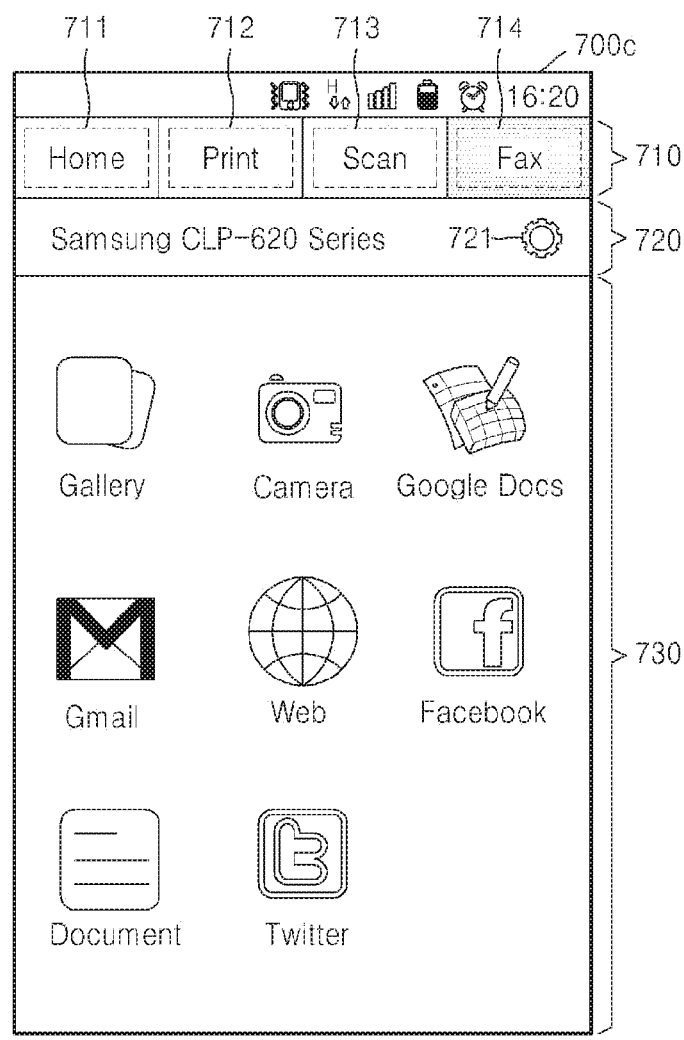

FIGS. 7A through 7C are diagrams illustrating screens 700a through 700c when print, scan, and fax menus 712, 713, and 714 are selected from among main menus of a mobile printing application, according to an exemplary embodiment of the present general inventive concept. Elements 710-714, 720-721, and 730 as illustrated in FIGS. 7A through 7C are the same as corresponding elements 310-314, 320-321, and 330, already described above with reference to FIG. 3, and so a detailed description thereof will be omitted.

Referring to screen 700a illustrated in FIG. 7A, if the print menu 712 is selected in a main menu area 710, a content display area 730 displays menus to select an image or a document to be printed. These menus include "Gallery" to print a photo stored in a mobile device 100, "Camera" to directly print a photo taken by the mobile device 100, "Google Docs" to print a document or an image stored in Google Docs, "Gmail" to print a document or an image received via Gmail, "Web" to print a document or the like retrieved from the Internet, "Facebook" to print a photo or the like stored in Facebook, "Document" to print a document stored in the mobile device 100, and "Twitter" to output a photo or the like stored in Twitter.

When NFC tagging is performed, a print operation may be automatically performed. For example, the mobile device 100 may be set in such a way that, if the mobile device 100 is performs NFC tagging on an NFC tag 210 attached to an MFP 200 while the print menu 712 is selected from among the main menus and a user selects "Gallery" and then selects one of photos stored in "Gallery", the mobile device 100 automatically transmits to the MFP 200 image data of the selected photo and a command to perform a print operation.

When the mobile device 100 and the MFP 200 are not connected before NFC tagging is performed, if NFC tagging is performed, a Wi-Fi Direct connection between the mobile device 100 and the MFP 200 as well as the transmission of the image data and the command may be automatically performed. Otherwise, when the mobile device 100 and the MFP 200 are already connected before NFC tagging is performed, if NFC tagging is performed, the transmission of the image data and the command may be automatically performed.

Referring to screen 700b, illustrated in FIG. 7B, if the scan menu 713 is selected in the main menu area 710, the content display area 730 displays scan-related contents. An area 731 of content display area 730 displays a list of scanned images stored in the mobile device 100, and buttons 732 and 733 to perform preview and scan operations are displayed on the content display area 730 under the area 731. A user may perform a scan operation by putting on the MFP 200 a document to be scanned and touching the "Scan" button 733. After the scan operation is completed, a preview operation of a scanned image may be requested by touching the "Preview" button 732.

When NFC tagging is performed, a scan operation may be automatically performed. For example, the mobile device 100 may be set in such a way that if the mobile device 100 is performs NFC tagging on the NFC tag 210 attached to the MFP 200 while the scan menu 713 is selected from among the main menus, the mobile device 100 automatically transmits to the MFP 200 a command to perform a scan operation.

When the mobile device 100 and the MFP 200 are not connected before NFC tagging is performed, if NFC tagging is performed, a Wi-Fi Direct connection between the mobile device 100 and the MFP 200 as well as the transmission of the command may be automatically performed. Otherwise, when the mobile device 100 and the MFP 200 are already connected before NFC tagging is performed, if NFC tagging is performed, the transmission of the command may be automatically performed.

Referring to screen 700c, illustrated in FIG. 7C, if the fax button 714 is selected in the main menu area 710, the content display area 730 displays menus to select an image or a document to be faxed. These menus are the same as the menus to select an image or a document to be printed, which are described above in relation to FIG. 7A.

When NFC tagging is performed, a fax operation may be automatically performed. For example, the mobile device 100 may be set in such a way that, when the fax button 714 is selected from among the main menus and a user selects "Document" and then selects one of documents stored in "Document", if the mobile device 100 performs NFC tagging on the NFC tag 210 attached to the MFP 200, the mobile device 100 automatically transmits to the MFP 200 the selected document and a command to perform a fax operation.

When the mobile device 100 and the MFP 200 are not connected before NFC tagging is performed, if NFC tagging is performed, a Wi-Fi Direct connection between the mobile device 100 and the MFP 200 as well as the transmission of the document and the command may be automatically performed. Otherwise, when the mobile device 100 and the MFP 200 are already connected before NFC tagging is performed, if NFC tagging is performed, the transmission of the document and the command may be automatically performed.

Figure 8:
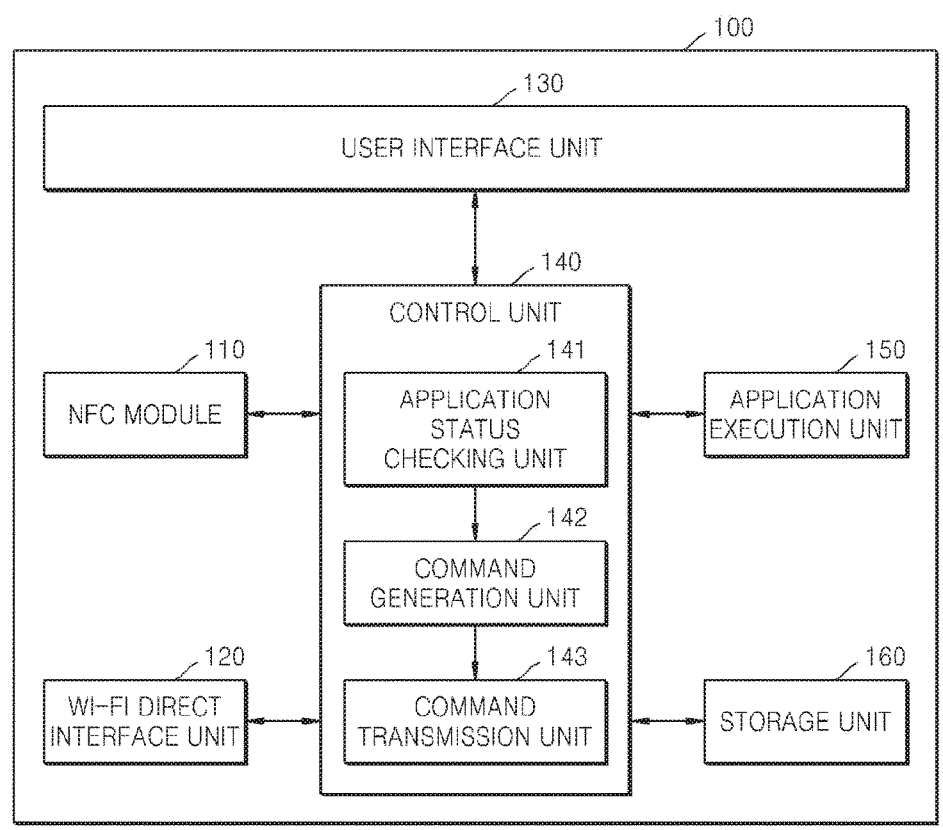
FIG. 8 is a diagram illustrating a hardware configuration of a mobile device, according to an exemplary embodiment of the present general inventive concept.

FIG. 8 is a diagram illustrating a hardware configuration of a mobile device 100, according to an exemplary embodiment of the present general inventive concept. Referring to FIG. 8, the mobile device 100 may include an NFC module 110, a Wi-Fi Direct interface unit 120, a user interface unit 130, a control unit 140, an application execution unit 150, and a storage unit 160. The control unit 140 may include an application status checking unit 141, a command generation unit 142, and a command transmission unit 143.

The NFC module 110 is an element for short-distance wireless communication and may include an antenna and an NFC chipset (not illustrated). If the mobile device 100 approaches an NFC tag 210 attached to an MFP 200, the NFC module 110 receives information of the MFP 200, which is stored in the NFC tag 210. In this case, the received information of the MFP 200 may include, for example, a MAC address, a device name, an application identifier, and an encrypted PIN of the MFP 200.

The Wi-Fi Direct interface unit 120 is an element to set a Wi-Fi Direct connection between the mobile device 100 and another device that supports Wi-Fi Direct. In an exemplary embodiment of the present general inventive concept, the mobile device 100 sets a Wi-Fi Direct connection to the MFP 200 via the Wi-Fi Direct interface unit 120 and transmits and receives data and a command for mobile printing.

The user interface unit 130 displays a screen to a user and receives various inputs from the user. For example, the user interface unit 130 may be formed as a touch screen and, if a mobile printing application is executed, may display an execution screen on the touch screen and may receive a touch input from the user.

The control unit 140 sets a Wi-Fi Direct connection to the MFP 200, executes the mobile printing application, and generates and transforms a command for mobile printing. The control unit 140 may allow a Wi-Fi Direct connection to be set between the mobile device 100 and the MFP 200 by using the information of the MFP 200, which is received by the NFC module 110, and may allow the mobile printing application to be executed by controlling the application execution unit 150.

The control unit 140 may control a function to be automatically performed according to a status of the mobile printing application at a point of time when the mobile device 100 performs NFC tagging on the MFP 200. In more detail, when the application execution unit 150 executes the mobile printing application, if the NFC module 110 of the mobile device 100 approaches the NFC tag 210 attached to the MFP 200 and thus NFC tagging is performed, the application status checking unit 141 of the control unit 140 checks the status of the mobile printing application. In this case, the status of the mobile printing application denotes, for example, a menu or a file currently selected on the mobile printing application, or a currently displayed execution screen of the mobile printing application.

If the application status checking unit 141 checks the status of the mobile printing application when NFC tagging is performed, the command generation unit 142 generates a command corresponding to the checked status, and the command transmission unit 143 transmits the generated command via the Wi-Fi Direct interface unit 120 to the MFP 200. For example, if the status of the mobile printing application when NFC tagging is performed, which is checked by the application status checking unit 141, denotes that a home menu is selected from among main menus, the command generation unit 142 generates a command requesting various types of status information of the MFP 200, and the command transmission unit 143 transmits the generated command via the Wi-Fi Direct interface unit 120 to the MFP 200. If the MFP 200 transmits the status information of the MFP 200 in response to the command, the mobile device 100 receives the status information of the MFP 200 via the Wi-Fi Direct interface unit 120, and the control unit 140 displays the status information on the user interface unit 130.

The storage unit 160 may store image data such as photos, as well as documents. The mobile device 100 may transmit to the MFP 200 image data or a document stored in the storage unit 160, so as to request a print or fax operation, or may receive from the MFP 200 image data or a document obtained by performing a scan operation, so as to store the received image data or the document in the storage unit 160.

A method of mobile printing using NFC, according to an exemplary embodiment of the present general inventive concept, will now be described in detail.

Figure 9:
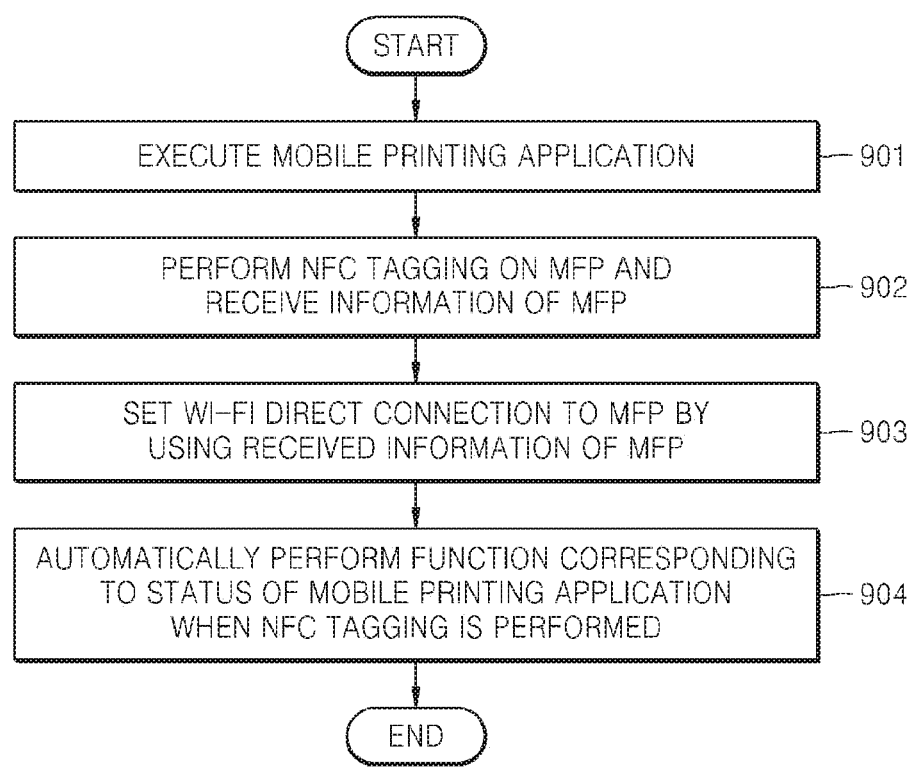
FIGS. 9, 10, 11, 12, and 13 are flowcharts of methods of mobile printing using NFC, according to exemplary embodiments of the present general inventive concept.

FIG. 9 is a flowchart of a method of mobile printing using NFC, according to an exemplary embodiment of the present general inventive concept. Referring to FIG. 9, a mobile printing application is executed on a mobile device 100 in operation 901. In this case, the mobile printing application may be executed if a user touches an icon of the mobile printing application, which may be displayed on a touch screen of the mobile device 100.

If the mobile printing application is executed and the mobile device 100 approaches an MFP 200, the mobile device 100 performs NFC tagging and receives information of the MFP 200 in operation 902. If the mobile device 100 approaches an NFC tag 210 attached to the MFP 200, an NFC module 110 of the mobile device 100 receives the information of the MFP 200, which is stored in the NFC tag 210. In this case, the received information may include, for example, a MAC address, a device name, and an encrypted PIN of the MFP 200.

The mobile device 100 attempts to set a Wi-Fi Direct connection to the MFP 200 by using the received information of the MFP 200 in operation 903. The mobile device searches 100 for a device having the received MAC address and, if the MFP 200 is found, requests the found MFP 200 for the Wi-Fi Direct connection. In this case, the Wi-Fi Direct connection may be set if the user presses a WPS button included in the MFP 200, or inputs a PIN via a user interface of the MFP 200. Alternatively, the Wi-Fi Direct connection may be automatically set without a user input if the mobile device 100 transmits to the MFP 200 the encrypted PIN included in the information of the MFP 200, which is received in operation 902. In order to set the Wi-Fi Direct connection by transmitting the encrypted PIN, firmware of the MFP 200 should support the above connection method. If it doesn't, the firmware of the MFP 200 may be updated to a version that supports the above connection method. Methods of updating firmware will be described in detail below with reference to FIGS. 14-18.

If the Wi-Fi Direct connection is set between the mobile device 100 and the MFP 200, the mobile device 100 and the MFP 200 automatically perform a function corresponding to a status of the mobile printing application when NFC tagging is performed, in operation 904. In other words, a function corresponding to a menu or a file currently selected on the mobile printing application when NFC tagging is performed is performed. For example, if NFC tagging is performed while a home menu is selected from among main menus of the mobile printing application, the mobile device 100 requests the MFP 200 for status information of the MFP 200, and receives and displays the status information on a screen. Alternatively, if NFC tagging is performed while a print menu is selected from among main menus of the mobile printing application, the mobile device 100 requests the MFP 200 to perform a print operation and the MFP 200 performs the print operation.

As such, by checking a status of a mobile printing application when NFC tagging is performed and automatically performing a function corresponding to the status, a desired operation may be easily performed by merely performing NFC tagging without a separate user input.

Figure 10:
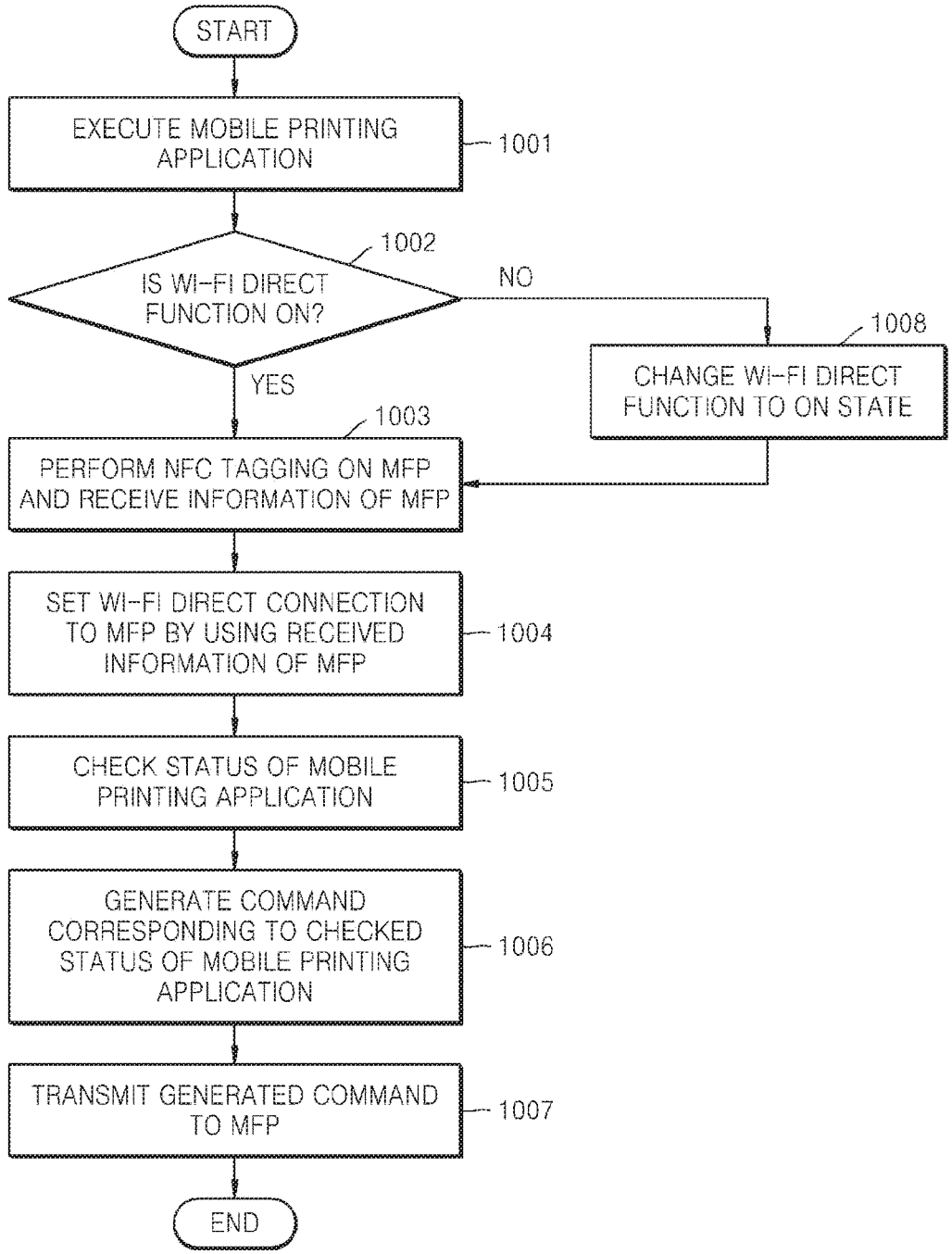

FIG. 10 is a flowchart of a method of mobile printing using NFC, according to another exemplary embodiment of the present general inventive concept.

Referring to FIG. 10, a mobile printing application is executed on a mobile device 100, in operation 1001. In this case, the mobile printing application may be executed if a user touches an icon of the mobile printing application, which is displayed on a touch screen of the mobile device 100.

If the mobile printing application is executed, it is determined whether a Wi-Fi Direct function of the mobile device 100 is on, in operation 1002. If it is determined that the Wi-Fi Direct function is on (operation 1002-Y), the method proceeds to operation 1003 and the mobile device 100 performs NFC tagging on an MFP 200 and receives information of the MFP 200, for example, a MAC address, a device name, and a PIN of the MFP 200. If it is determined that the Wi-Fi Direct function is off (operation 1002-N), the method proceeds to operation 1008 and the Wi-Fi Direct function of the mobile device 100 is changed to an on state, and then the method proceeds to operation 1003. In this case, operation 1008 may be performed by displaying on a screen of the mobile device 100 a message illustrated for example in FIG. 4A, indicating that the Wi-Fi Direct function should be on to use the mobile printing application, and receiving from the user an input to change the Wi-Fi Direct function to an on state.

A Wi-Fi Direct connection is set to the MFP 200 by using the received information of the MFP 200 in operation 1004. If the Wi-Fi Direct connection is completely set, a status of the mobile printing application is checked in operation 1005. In more detail, the status of the mobile printing application at a point of time when NFC tagging is performed in operation 1003 is checked. In this case, the status of the mobile printing application denotes, for example, a menu or a file currently selected on the mobile printing application, or a currently displayed application screen of the mobile device 100.

A command corresponding to the status of the mobile printing application, which is checked in operation 1005, is generated in operation 1006, and the generated command is transmitted to the MFP 200 in operation 1007.

As such, by checking a status of a mobile printing application when NFC tagging is performed and automatically performing a function corresponding to the status, a desired operation may be easily performed by merely performing NFC tagging without a separate user input.

Figure 11:
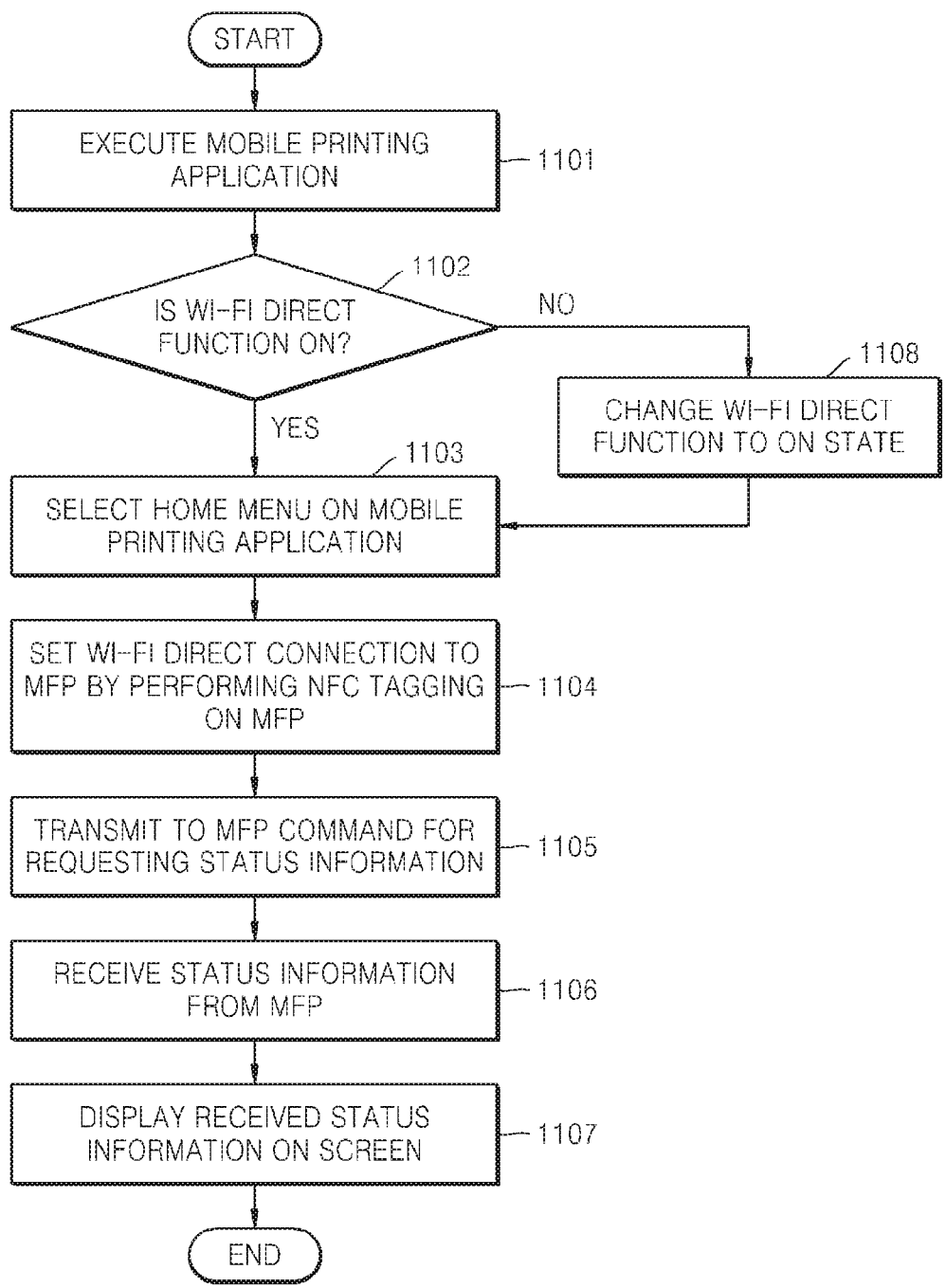

FIG. 11 is a flowchart of a method of mobile printing using NFC, according to an exemplary embodiment of the present general inventive concept. Specifically, FIG. 11 illustrates a case when NFC tagging is performed while a home menu of a mobile printing application is selected.

Referring to FIG. 11, the mobile printing application is executed in operation 1101. It is determined whether a Wi-Fi Direct function is on, in operation 1102. If the Wi-Fi Direct function is not on (operation 1102-N), the method proceeds to operation 1108 and the Wi-Fi Direct function is changed to an on state. If the Wi-Fi Direct function is on (operation 1102-Y), the method proceeds to operation 1103.

A home menu is selected from among main menus of the mobile printing application in operation 1103. In this case, the home menu may be manually selected by a user, or may be set as a default menu and thus may be selected by default when the mobile printing application is executed. In the latter case, operation 1103 may be omitted.

A mobile device 100 performs NFC tagging on an MFP 200 and sets a Wi-Fi Direct connection to the MFP 200 in operation 1104. A process of performing NFC tagging and setting a Wi-Fi Direct connection has already been described above in detail, and so will not be repeated here. If the Wi-Fi Direct connection is set, the mobile device 100 transmits to the MFP 200 a command to request status information, in operation 1105. Since the home menu is selected on the mobile printing application when NFC tagging is performed in operation 1104, a command requesting the status information of the MFP 200 and corresponding to the home menu is transmitted. If a print, scan, or fax menu, instead of the home menu, is selected on the mobile printing application when NFC tagging is performed, a command corresponding to the selected menu is transmitted.

If the MFP 200 transmits the status information in response to the command requesting the status information, the mobile device 100 receives the status information in operation 1106, and displays the status information on a screen to allow the user to check it in operation 1107.

As such, by including a home menu to manage information and settings of an MFP 200 in a mobile printing application and automatically receiving and displaying status information of the MFP 200 when NFC tagging is performed while the home menu is selected, the information and settings of the MFP 200 may be easily managed.

Figure 12:
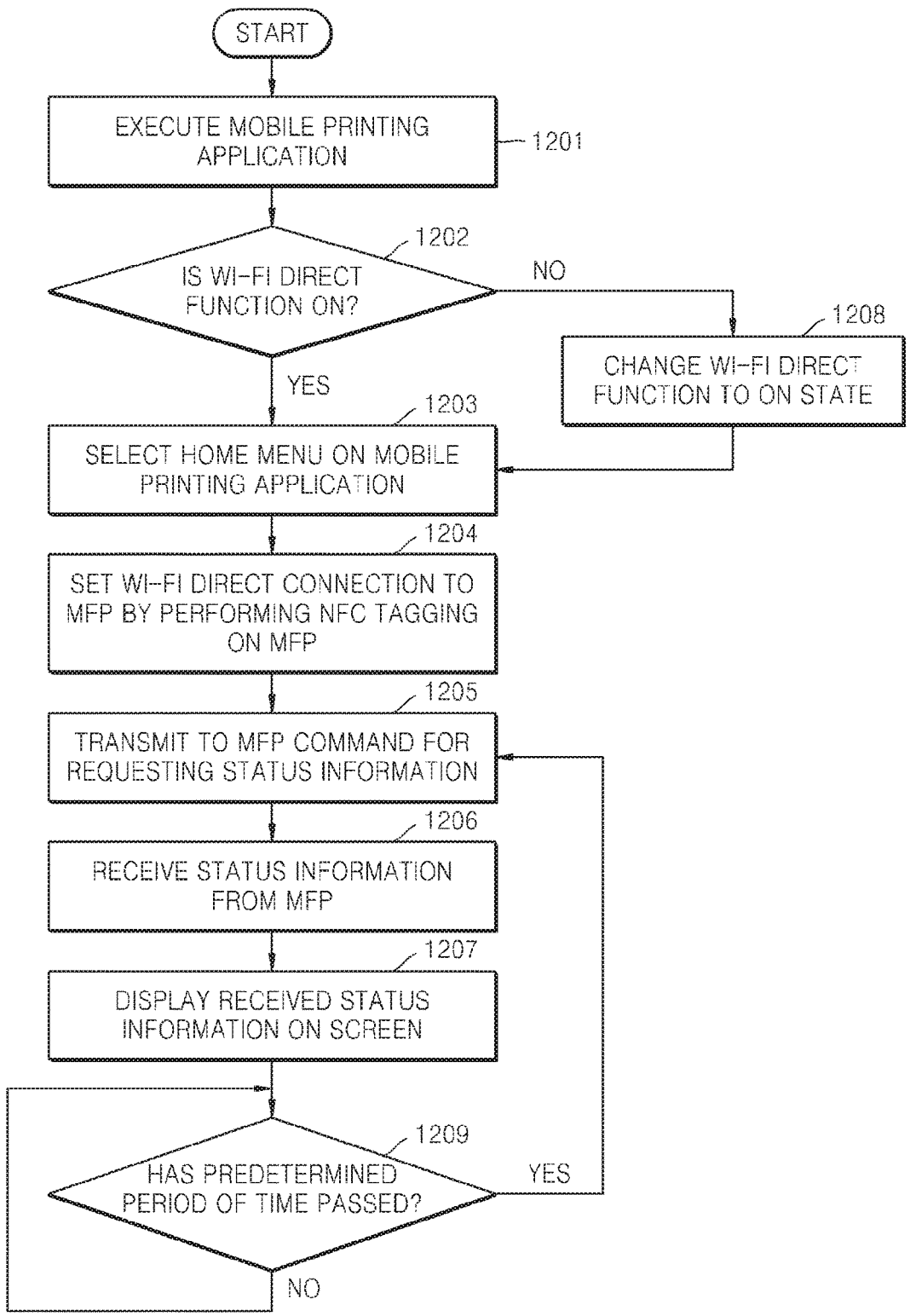

When a Wi-Fi Direct connection is set between a mobile device 100 and an MFP 200, status information of the MFP 200 may be cyclically updated. A method thereof is illustrated in FIG. 12. Operations 1201 through 1208 of FIG. 12 are respectively the same as operations 1101 through 1108 of FIG. 11, and thus detailed descriptions thereof are not provided here.

Referring to FIG. 12, after status information of an MFP 200 is displayed on a screen of a mobile device 100 in operation 1207, it is determined whether a certain period of time has passed in operation 1209. If the certain period of time has not passed (operation 1209-N), no particular operation is performed. If the certain period of time has passed (operation 1209-Y), the method returns to operation 1205 and the mobile device 100 transmits to the MFP 200 a command requesting the status information.

As such, by cyclically updating status information of an MFP 200 and displaying the status information on a mobile device 100 while the mobile device 100 and the MFP 200 are wirelessly connected, a user may easily check the latest information of the MFP 200.

If a Wi-Fi Direct connection is set between a mobile device 100 and an MFP 200 while a home menu is selected on the mobile printing application, a user may not only check status information of the MFP 200 but also manage various settings of the MFP 200 by using a mobile printing application. A detailed description thereof will now be provided with reference to FIG. 13.

Figure 13:
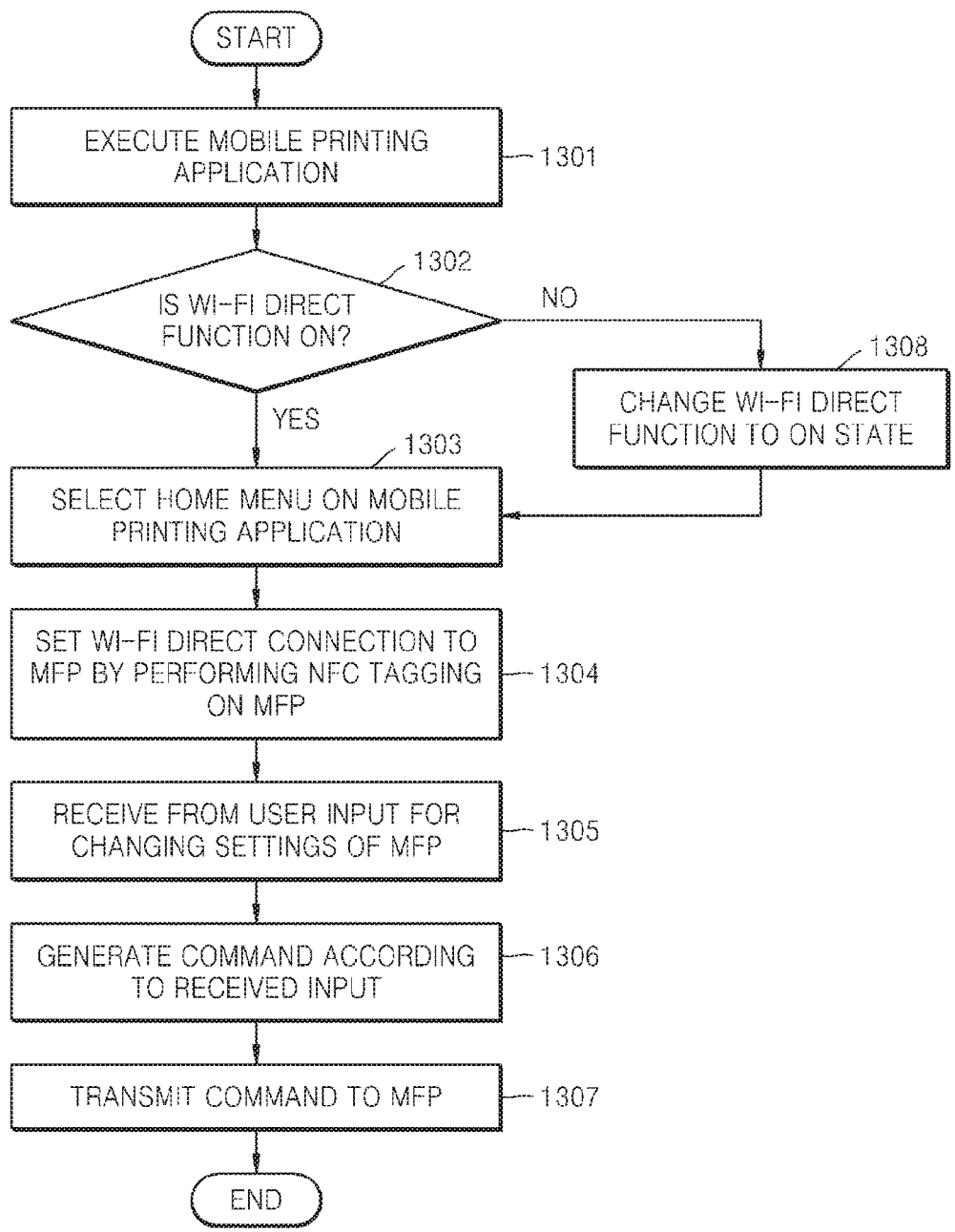

FIG. 13 is a flowchart of a method of mobile printing using NFC, according to another exemplary embodiment of the present general inventive concept. Operations 1301 through 1304, and 1308 of FIG. 13 are respectively the same as operations 1101 through 1104, and 1108 of FIG. 11, and thus detailed descriptions thereof are not provided here.

Referring to FIG. 13, an input to change settings of an MFP 200 is received from a user in operation 1305. The user may activate a screen to manage the settings of the MFP 200, by touching a device settings button while a home menu is selected on a mobile printing application, may select an item of which settings are to be changed, and then may input a desired setup value.

If the input to change the settings of the MFP 200 is received from the user, a command to change the settings may be generated according to the received input in operation 1306, and the generated command may be transmitted to the MFP 200 in operation 1307.

As such, since a user may manage various settings of an MFP 200 by using a mobile printing application installed in a mobile device 100, user convenience may be improved.

As described above, in some cases, firmware of the MFP 200 needs to be updated to set a Wi-Fi Direct connection between the mobile device 100 and the MFP 200 via NFC tagging. For example, since a method in which an encrypted PIN is stored in an NFC tag 210 attached to an MFP 200 and a mobile device 100 receives the PIN stored in the NFC tag 210 when NFC tagging is performed and automatically transmits the PIN to the MFP 200 so as to request a Wi-Fi Direct connection does not follow the Wi-Fi Direct standards, for the above-described method, firmware of the MFP 200 should be updated. A method of updating firmware will now be described in detail.

Figure 14:
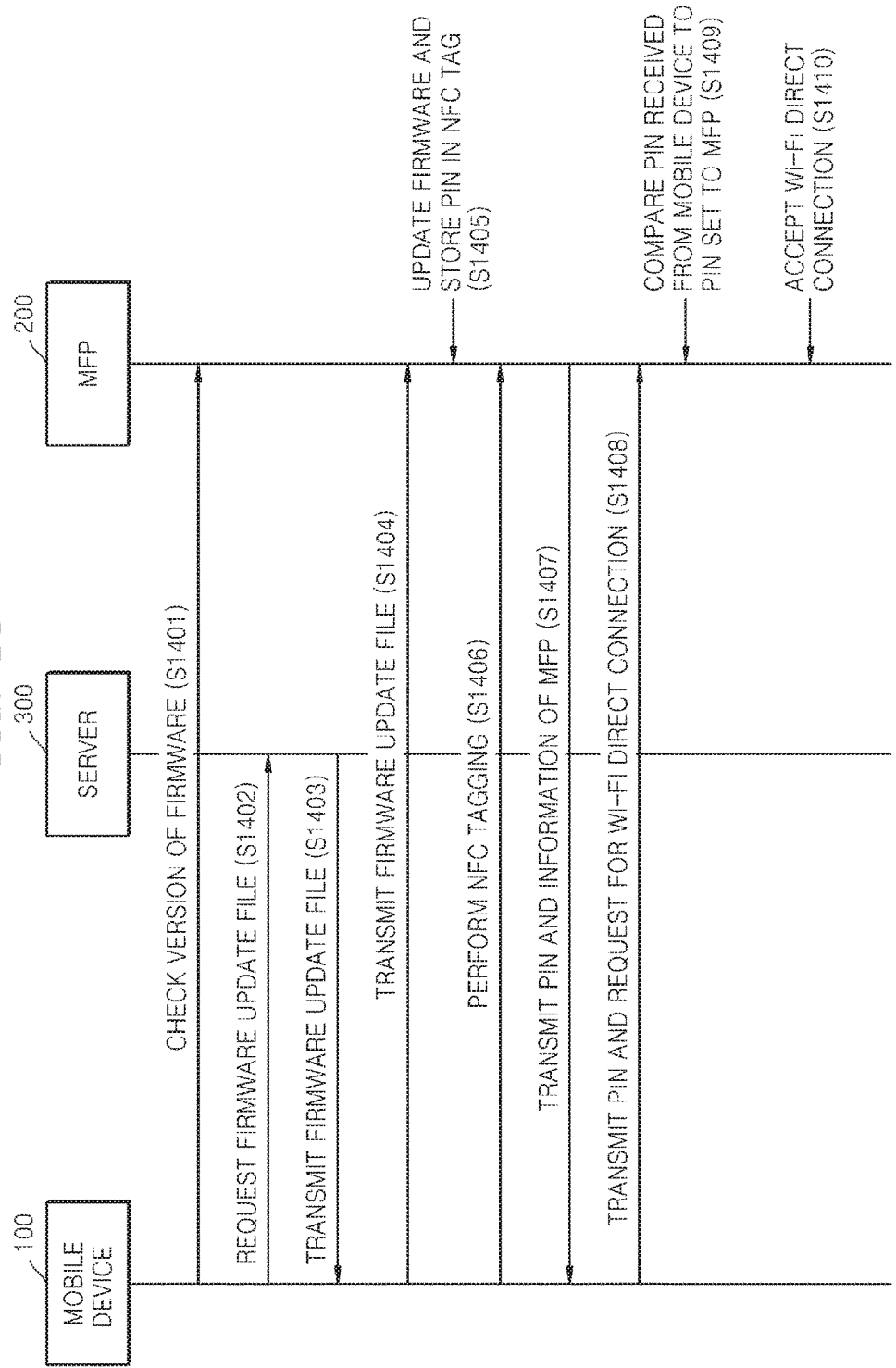
FIGS. 14 and 15 are diagrams illustrating processes of updating firmware of an MFP in a system of mobile printing using NFC, according to exemplary embodiments of the present general inventive concept.

FIG. 14 is a diagram illustrating a process of updating firmware of an MFP 200 in a system of mobile printing using NFC, according to an exemplary embodiment of the present general inventive concept. As illustrated in FIG. 14, the system according to the current exemplary embodiment may further include a server 300 to update the firmware of the MFP 200.

Referring to FIG. 14, a mobile device 100 checks a version of the firmware of the MFP 200 (operation S1401). In this case, in order to allow the mobile device 100 to check the version of the firmware of the MFP 200, the mobile device 100 and the MFP 200 may be connected by a cable via universal serial bus (USB) ports, or may be connected via Wi-Fi Direct according to an existing method in which a user manually inputs a PIN to the MFP 200. As part of checking the version of the firmware of the MFP 200, the mobile device 100 checks whether the version of the firmware of the MFP 200 supports Wi-Fi Direct connection via automatic transmission of a PIN.

If the version of the firmware of the MFP 200 supports Wi-Fi Direct connection via automatic transmission of a PIN, the firmware does not need to be updated, and the method ends. However, if the version of the firmware of the MFP 200 does not support Wi-Fi Direct connection via automatic transmission of a PIN, the firmware should be updated and thus the mobile device 100 requests the server 300 for a firmware update file (operation S1402). The server 300 receives the request and transmits the firmware update file to the mobile device 100 (operation S1403), and the mobile device 100 transmits the received firmware update file to the MFP 200 (operation S1404).

The MFP 200 receives the firmware update file and updates the firmware, and a PIN is encrypted and stored in an NFC tag 210 attached to the MFP 200 (operation S1405). In this case, the PIN may be stored in the NFC tag 210 in various ways. For example, the user may check the PIN set to the MFP 200 by using a "Print Report" function of the MFP 200, and may store the checked PIN value in the NFC tag 210. Alternatively, the user may store a desired PIN value in the NFC tag 210 and the PIN value of the MFP 200 may be changed to correspond to the stored PIN value. In this case, for security's sake, the PIN is encrypted before being stored in the NFC tag 210.

If the mobile device 100 NFC-tags the MFP 200 after the firmware is updated and the PIN is stored in the NFC tag 210 (operation S1406), an NFC module 110 of the mobile device 100 receives information of the MFP 200, for example, a MAC address, a device name, and a PIN of the MFP 200, from the NFC tag 210 attached to the MFP 200 (operation S1407). Then, the mobile device 100 transmits to the MFP 200 the PIN and a request for a Wi-Fi Direct connection by using the received information of the MFP 200 (operation S1408). Since the updated firmware of the MFP 200 supports Wi-Fi Direct connection via automatic transmission of a PIN, the PIN received from the mobile device 100 is compared to the PIN set to the MFP 200 in operation S1409 and, if the PINs are identical, the Wi-Fi Direct connection is accepted in operation S1410.

Figure 15:
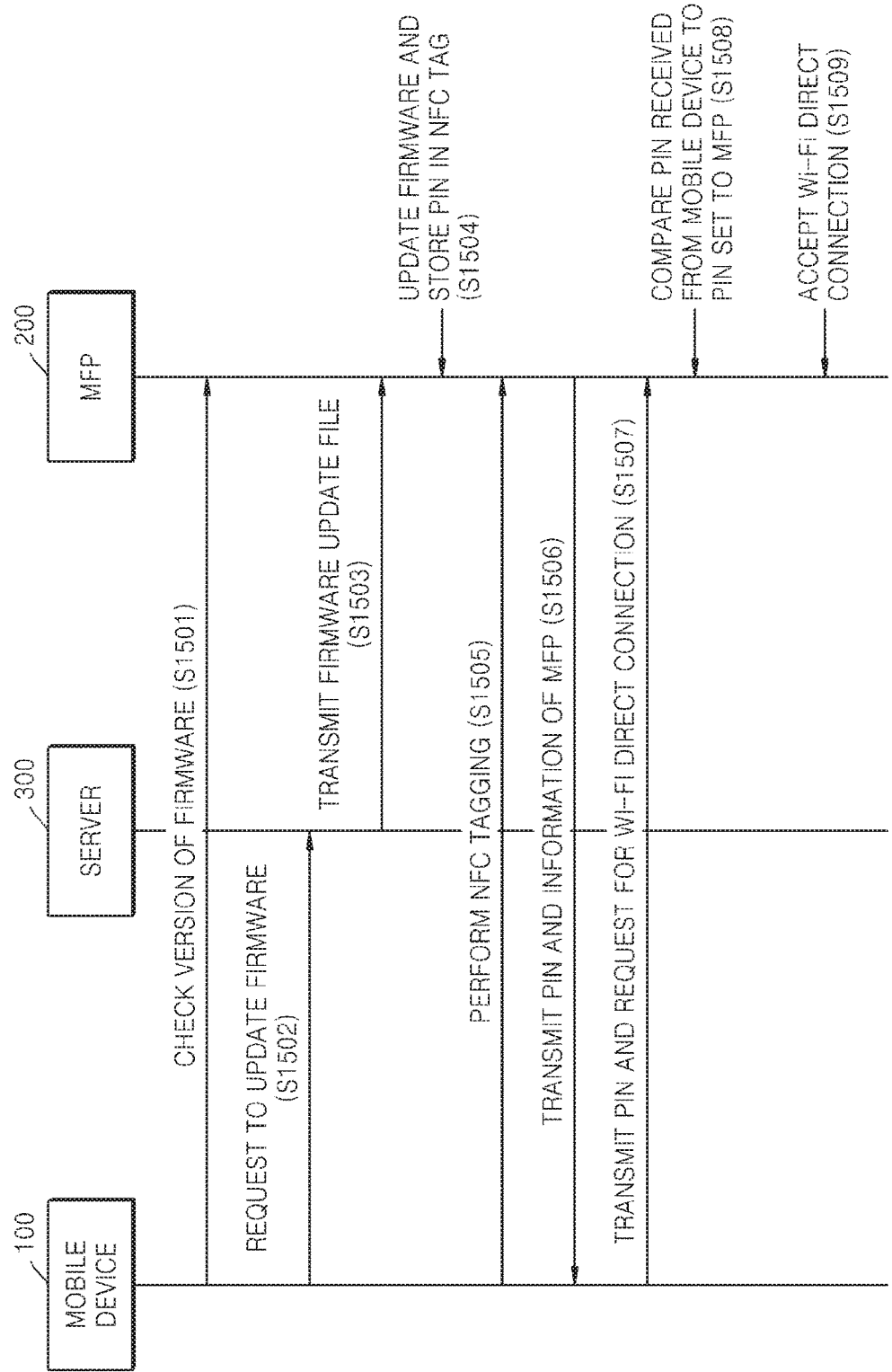

Although the mobile device 100 receives the firmware update file from the server 300 and then transmits the firmware update file to the MFP 200 in the firmware update method of FIG. 14, as illustrated in FIG. 15, the mobile device 100 may not receive the firmware update file but may request the server 300 to transmit the firmware update file directly to the MFP 200. Referring to FIG. 15, if the mobile device 100 requests the server 300 to update the firmware (operation S1502), the server 300 transmits a firmware update file directly to the MFP 200 instead of the mobile device 100 (operation S1503). The other operations of FIG. 15, i.e., operations S1501 and S1504 through S1509 are the same as the corresponding operations S1401 and S1405 through S1410 of FIG. 14, and thus detailed descriptions thereof are not provided here.

Unlike the above exemplary embodiments of FIGS. 14 and 15, a mobile device 100 may not be involved and an MFP 200 itself may compare a version of installed firmware to the latest version of firmware stored in a server 300 and, if the versions are not identical, may request the server 300 for a firmware update file so as to update the firmware.

Figure 16:
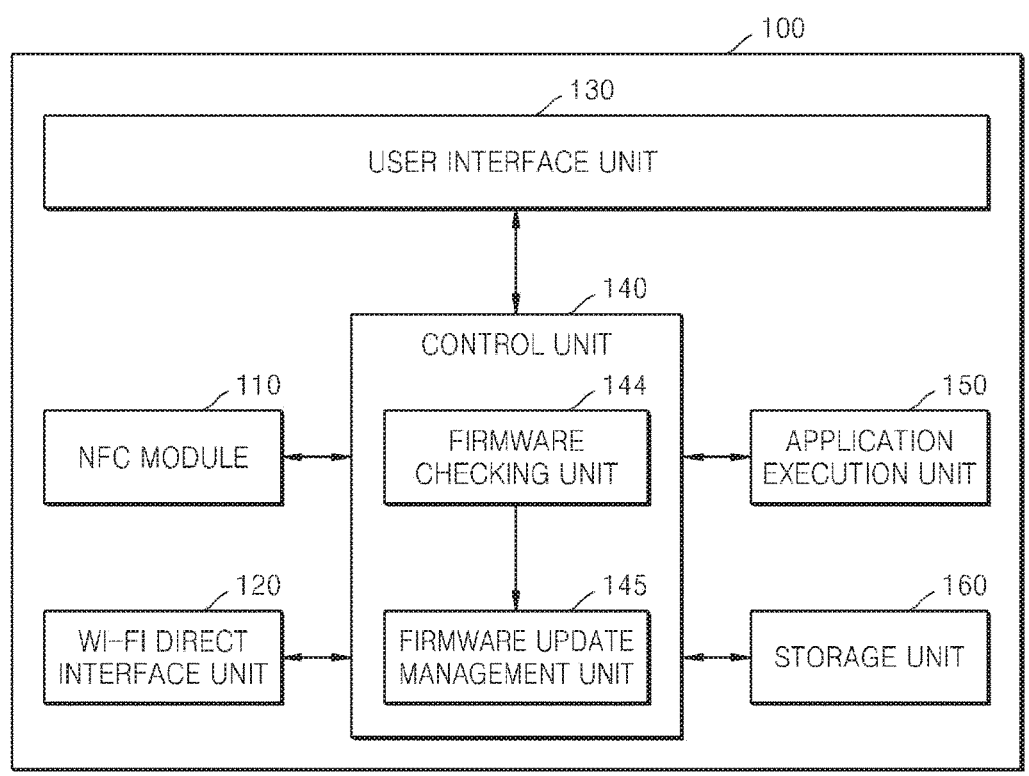
FIG. 16 is a diagram illustrating a hardware configuration of a mobile device, according to another exemplary embodiment of the present general inventive concept.

FIG. 16 is a diagram illustrating a hardware configuration of a mobile device 100, according to another exemplary embodiment of the present general inventive concept. The mobile device 100 of FIG. 16 may include an NFC module 110, a Wi-Fi Direct interface unit 120, a user interface unit 130, a control unit 140, an application execution unit 150, and a storage unit 160. From among them, the control unit 140 may include a firmware checking unit 144 and a firmware update management unit 145.

The elements other than the firmware checking unit 144 and the firmware update management unit 145 are the same as those illustrated in FIG. 8, and so only the firmware checking unit 144 and the firmware update management unit 145 will be described in detail here.

The firmware checking unit 144 checks whether a version of firmware of an MFP 200 supports Wi-Fi Direct connection via automatic transmission of a PIN. In this case, in order to allow the firmware checking unit 144 included in the mobile device 100 to check the version of the firmware of the MFP 200, a connection for data transmission and reception should be set between the mobile device 100 and the MFP 200. Accordingly, while USB ports of the mobile device 100 and the MFP 200 may be connected by a cable, the firmware checking unit 144 may check the version of the firmware of the MFP 200. Here, other wire or wireless connection methods aside from USB ports may also be used. The firmware checking unit 144 transmits a checking result to the firmware update management unit 145.

If the checked version of the firmware of the MFP 200 supports Wi-Fi Direct connection via automatic transmission of a PIN, the firmware does not need to be updated and thus the firmware update management unit 145 does not perform any operation. However, if the checked version of the firmware of the MFP 200 does not support Wi-Fi Direct connection via automatic transmission of a PIN, the firmware of the MFP 200 is updated. In other words, the firmware update management unit 145 requests a server 300 for a firmware update file, receives the firmware update file, and transmits the received firmware update file to the MFP 200. Alternatively, the firmware update management unit 145 may not receive the firmware update file from the server 300 but may request the server 300 to transmit the firmware update file directly to the MFP 200.

Figure 17:
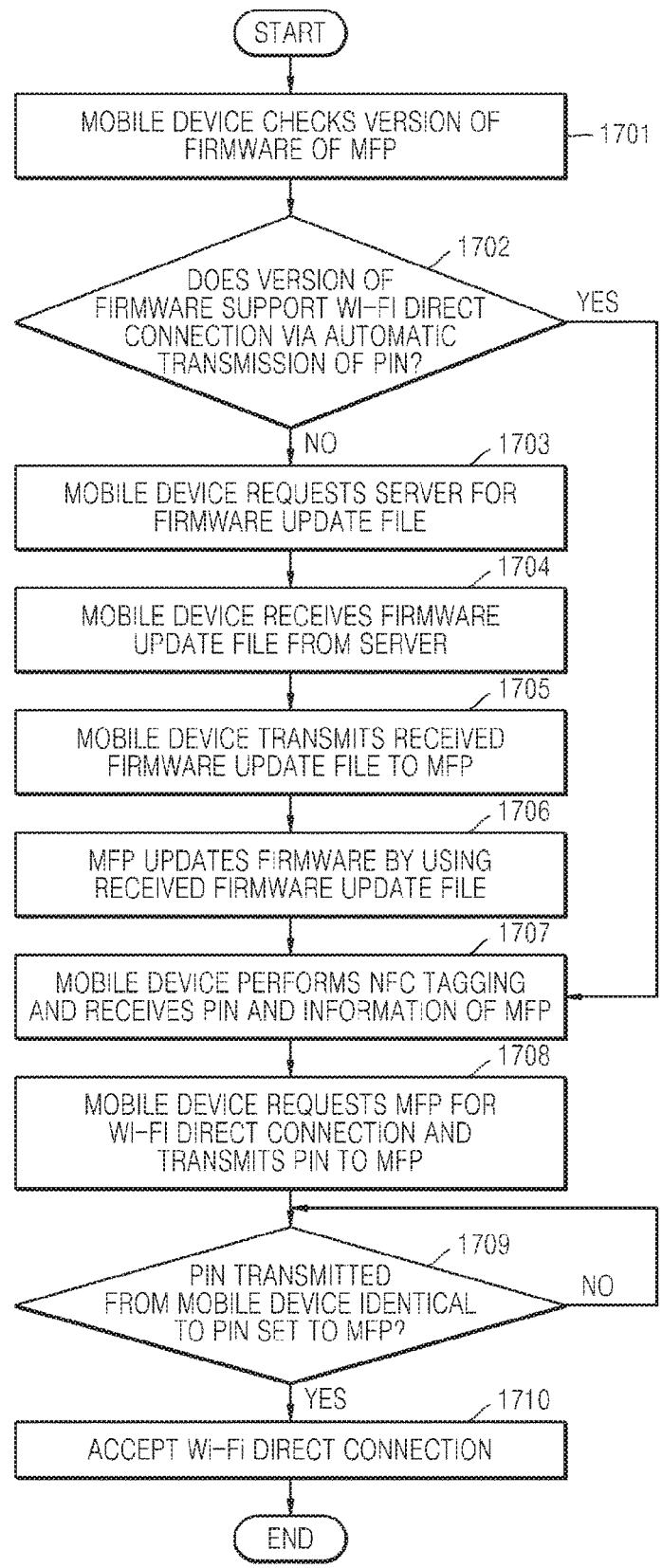
FIGS. 17 and 18 are flowcharts of methods of updating firmware of an MFP in a system of mobile printing using NFC, according to exemplary embodiments of the present general inventive concept.
Figure 18:
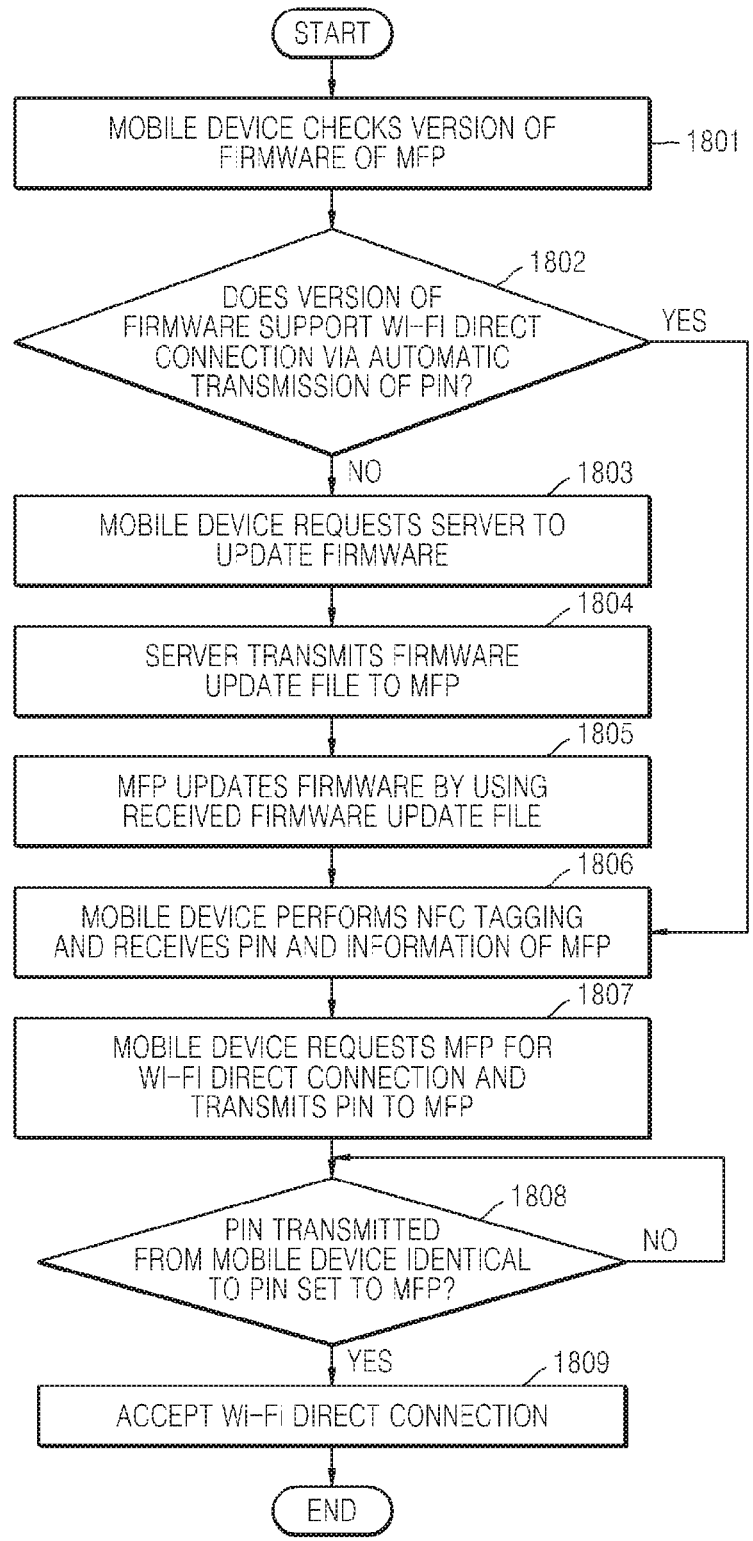

FIGS. 17 and 18 are flowcharts of methods of updating firmware of an MFP 200 in a system of mobile printing using NFC, according to exemplary embodiments of the present general inventive concept.

Referring to FIG. 17, a version of firmware installed in an MFP 200 is checked in operation 1701, and it is determined whether the version of the firmware supports Wi-Fi Direct connection via automatic transmission of a PIN, in operation 1702. If the version supports Wi-Fi Direct connection via automatic transmission of a PIN (operation 1702-Y), the method proceeds to operation 1707. Otherwise (operation 1702-N), the method proceeds to operation 1703. A mobile device 100 requests a server 300 for a firmware update file in operation 1703, and receives the firmware update file from the server 300 in operation 1704. The mobile device 100 transmits the received firmware update file to the MFP 200 in operation 1705. The MFP 200 updates the firmware by using the firmware update file received from the mobile device 100, in operation 1706. In this case, when the firmware is updated, a PIN is encrypted and stored in an NFC tag 210 attached to the MFP 200.

If the firmware of the MFP 200 is completely updated to a version that supports Wi-Fi Direct connection via automatic transmission of a PIN, then in operation 1707 when the mobile device 100 performs NFC tagging on the MFP 200, the mobile device 100 receives from the NFC tag 210 the PIN together with information of the MFP 200, for example, a MAC address and a device name of the MFP 200. The mobile device 100 requests the MFP 200 to connect via Wi-Fi Direct by using the received information of the MFP 200, and transmits the received PIN to the MFP 200, in operation 1708. If the Wi-Fi Direct connection is requested in operation 1708, then in operation 1709 the MFP 200 determines whether the PIN transmitted from the mobile device 100 is identical to the PIN set to the MFP 200 and, if the PINs are identical (operation 1709-Y), accepts the Wi-Fi Direct connection in operation 1710.

Although the mobile device 100 receives the firmware update file from the server 300 and then transmits the firmware update file to the MFP 200 in the firmware update method of FIG. 17, as illustrated in FIG. 18, the mobile device 100 may merely request the server 300 to transmit the firmware update file directly to the MFP 200.

Referring to FIG. 18, a version of firmware installed in an MFP 200 is checked in operation 1801, and it is determined whether the version of the firmware supports Wi-Fi Direct connection via automatic transmission of a PIN, in operation 1802. If the version supports Wi-Fi Direct connection via automatic transmission of a PIN, the method proceeds to operation 1806. Otherwise, the method proceeds to operation 1803. If a mobile device 100 requests a server 300 to update the firmware in operation 1803, the server 300 transmits a firmware update file directly to the MFP 200 in operation 1804. The MFP 200 updates the firmware by using the firmware update file received from the server 300, in operation 1805. In this case, when the firmware is updated, a PIN is encrypted and stored in an NFC tag 210 attached to the MFP 200.

If the firmware of the MFP 200 is completely updated to a version that supports Wi-Fi Direct connection via automatic transmission of a PIN, when the mobile device 100 NFC-tags the MFP 200, the mobile device 100 receives from the NFC tag 210 the PIN together with information of the MFP 200, for example, a MAC address and a device name of the MFP 200, in operation 1806. The mobile device 100 requests the MFP 200 for a Wi-Fi Direct connection by using the received information of the MFP 200, and transmits the received PIN to the MFP 200, in operation 1807. If the Wi-Fi Direct connection is requested in operation 1807, then in operation 1808 the MFP 200 determines whether the PIN transmitted from the mobile device 100 is identical to the PIN set to the MFP 200 and, if the PINs are identical, accepts the Wi-Fi Direct connection in operation 1809.

As such, by updating firmware of an MFP 200, a Wi-Fi Direct connection may be automatically set between a mobile device 100 and the MFP 200 without requiring a user to manually input a PIN.

As described above, according to the one or more of the above exemplary embodiments of the present general inventive concept, a user may easily perform mobile printing by merely performing NFC tagging. Also, information of an MFP 200 may be checked and various settings of the MFP 200 may be managed by using a mobile printing application executed on a mobile device 100.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of mobile printing using near field communication (NFC), the method comprising:
   receiving, via an NFC module, NFC tag information of an image forming apparatus at a mobile terminal via the NFC;
   establishing, via a WiFi unit, a wireless connection with the image forming apparatus using the NFC tag information of the image forming apparatus; and
   transmitting, via the WiFi unit, a fax command selected on a mobile printing application and data to be output as a fax according to the fax command instructing to output the data as the fax, via the wireless connection.

2. The method of claim 1, further comprising:
   receiving status information of the image forming apparatus if NFC tagging is performed while a home menu is selected,
   wherein the mobile printing application comprises the home menu to manage the image forming apparatus.

3. The method of claim 2, wherein the receiving of the status information comprises cyclically receiving status information from the image forming apparatus so as to update the status information.

4. The method of claim 1, further comprising changing settings of the image forming apparatus by using the mobile printing application.

5. The method of claim 4, wherein the changing of the settings of the image forming apparatus comprises:
displaying at the mobile terminal a screen to manage the settings of the image forming apparatus according to a selection of a user; and
transmitting from the mobile terminal a command corresponding to an input to the image forming apparatus via the wireless connection, if an input to change the setting of the image forming apparatus is received from the user.

6. The method of claim 1, wherein, if the mobile printing application is executed, a home menu is selected by default.

7. The method of claim 1, wherein the image forming apparatus wirelessly connected via NFC tagging while a home menu is selected on the mobile printing application is set as an apparatus to perform all mobile printing operations.

8. The method of claim 1,
wherein the NFC tag information of the image forming apparatus comprises a media access control (MAC) address, and
wherein the establishing of the wireless connection comprises:
searching for an apparatus corresponding to the received MAC address; and
transmitting a request for the wireless connection to the image forming apparatus if the image forming apparatus is found establishing the wireless connection with the image forming apparatus.

9. The method of claim 8,
wherein the NFC tag information of the image forming apparatus further comprises a personal identification number (PIN),
wherein the transmitting of the request for the wireless connection comprises transmitting the received PIN, and
wherein the establishing of the wireless connection comprises establishing the wireless connection with the image forming apparatus if it is determined that the PIN is identical to the PIN set to the image forming apparatus.

10. A non-transitory computer-readable recording medium to contain computer-readable codes as a program to execute the method of claim 1.

11. A mobile device using near field communication (NFC), the mobile device comprising:
a NFC module configured to receive information from an NFC tag;
a wireless unit configured to wirelessly connect to an image forming apparatus; and
a processor programmed with a mobile printing application configured to:
receive, via the NFC module, NFC tag information of an image forming apparatus,
establish, via the wireless unit, a wireless connection with the image forming apparatus using the NFC tag information of the image forming apparatus, and
transmit a fax command and data to be output as a fax according to the fax command instructing to output the data as the fax, via the wireless connection.

12. The mobile device of claim 11, further comprising:
a user interface unit configured to display a fax menu on the mobile printing application.

13. The mobile device of claim 11, wherein the processor programmed with the mobile printing application is further configured to change settings of the image forming apparatus.

14. The mobile device of claim 13,
wherein, in response to changing the settings of the image forming apparatus, the user interface unit is further configured to display a screen to manage the settings of the image forming apparatus according to a selection of a user, and
wherein, in response to changing the settings of the image forming apparatus, the wireless unit is further configured to transmit a command corresponding to the input to the image forming apparatus via the set wireless connection, if an input to change the setting of the image forming apparatus is received from the user.

15. The mobile device of claim 11, wherein, when the mobile printing application is executed, a home menu is selected by default.

16. The mobile device of claim 11, wherein the image forming apparatus wirelessly connected via NFC tagging while a home menu is selected on the mobile printing application is set as an apparatus to perform all mobile printing operations.

17. The mobile device of claim 11,
wherein the NFC tag information of the image forming apparatus comprises a media access control (MAC) address, and
wherein the setting of the wireless connection comprises:
searching for an apparatus corresponding to the received MAC address;
transmitting a request for the wireless connection to the image forming apparatus if the image forming apparatus is found; and
establishing the wireless connection with the image forming apparatus.

18. The mobile device of claim 17,
wherein the NFC tag information of the image forming apparatus further comprises a personal identification number (PIN),
wherein the transmitting of the request for the wireless connection comprises transmitting the received PIN, and
wherein the establishing with the image forming apparatus of the wireless connection comprises establishing with the image forming apparatus the wireless connection if it is determined that the PIN is identical to the PIN set to the image forming apparatus.

* * * * *